United States Patent
Campbell et al.

(10) Patent No.: US 10,197,713 B2
(45) Date of Patent: *Feb. 5, 2019

(54) LIGHT DIRECTING FILM AND METHOD FOR MAKING THE SAME

(71) Applicant: 3M INNOVATIVE PROPERTIES COMPANY, St. Paul, MN (US)

(72) Inventors: Alan B. Campbell, Santa Rosa, CA (US); Dale L. Ehnes, Cotati, CA (US); John F. Van Derlofske, III, Minneapolis, MN (US); Mark R. Dupre, Oakdale, MN (US); Stephen J. Dreyer, North Saint Paul, MN (US); Patrick H. Marushin, Sartell, MN (US); Todd M. Johnson, Saint Paul, MN (US); Bryan V. Hunt, Anoka, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,883

(22) Filed: Nov. 6, 2017

(65) Prior Publication Data
US 2018/0059294 A1 Mar. 1, 2018

Related U.S. Application Data

(63) Continuation of application No. 12/934,855, filed as application No. PCT/US2009/039077 on Apr. 1, 2009, now Pat. No. 9,810,817.
(Continued)

(51) Int. Cl.
*G02B 5/04* (2006.01)
*F21V 8/00* (2006.01)
*G02F 1/1335* (2006.01)

(52) U.S. Cl.
CPC .......... *G02B 5/045* (2013.01); *G02B 6/0053* (2013.01); *G02F 1/133615* (2013.01); *G02F 2001/133607* (2013.01)

(58) Field of Classification Search
CPC ........ G02B 5/00–5/009; G02B 27/12–27/126; G02B 27/285; G02B 6/0016;
(Continued)

(56) References Cited

U.S. PATENT DOCUMENTS

| 1,348,115 A | 7/1920 | Hutchinson |
| 2,404,222 A | 7/1946 | Doner |

(Continued)

FOREIGN PATENT DOCUMENTS

| CH | 359899 | 3/1962 |
| CN | 1655920 | 8/2005 |

(Continued)

OTHER PUBLICATIONS

Adams, "Focused Ion Beam Shaped Micro-Cutting Tools for Fabricating Curvilinear Features"; Proceedings of the Fifteenth Annual Meeting of the American Society for Precision Engineering; 2000, vol. 22, pp. 176-179.

(Continued)

*Primary Examiner* — William R Alexander
*Assistant Examiner* — Jeffrey Madonna
(74) *Attorney, Agent, or Firm* — Michael Stern

(57) ABSTRACT

A light directing film includes a structured major surface with a plurality of microstructures extending along a first direction. Each microstructure has a first region and a second region different from the first region, a substantially constant height in the first region and a non-constant maximum height in the second region greater than the substantially constant height in the first region, and a same lateral cross sectional shape in the first region and the second region.

20 Claims, 19 Drawing Sheets

Related U.S. Application Data

(60) Provisional application No. 61/041,751, filed on Apr. 2, 2008.

(58) Field of Classification Search
CPC ............... G02B 6/0025; G02B 6/0053; G02F 2001/133607; G02F 1/133611
See application file for complete search history.

(56) References Cited

U.S. PATENT DOCUMENTS

| | | |
|---|---|---|
| 2,733,730 A | 3/1956 | Boyajean |
| 2,738,730 A | 3/1956 | Boyajean |
| 3,293,727 A | 12/1966 | Simms |
| 3,417,959 A | 12/1968 | Schultz |
| 3,680,213 A | 8/1972 | Reichert |
| 3,780,409 A | 12/1973 | Bartoszevicz |
| 3,813,970 A | 6/1974 | Mitchell |
| 3,893,356 A | 7/1975 | Atzberger |
| 4,012,843 A | 3/1977 | Harada |
| 4,035,590 A | 7/1977 | Halter |
| 4,044,379 A | 8/1977 | Halter |
| 4,111,083 A | 9/1978 | Carter |
| 4,113,266 A | 9/1978 | Alexandrovich |
| 4,113,267 A | 9/1978 | Wittenberg |
| 4,287,689 A | 9/1981 | Mindel |
| 4,355,382 A | 10/1982 | Dholakia |
| 4,417,489 A | 11/1983 | Liu |
| 4,488,840 A | 12/1984 | Pollington |
| 4,504,940 A | 3/1985 | Nishiguchi |
| 4,525,751 A | 6/1985 | Freeman |
| 4,863,321 A | 9/1989 | Lieser |
| 4,984,642 A | 1/1991 | Renard |
| 4,986,150 A | 1/1991 | Okazaki |
| 5,007,709 A | 4/1991 | Iida |
| 5,193,014 A | 3/1993 | Takenouchi |
| 5,216,843 A | 6/1993 | Breivogel |
| 5,239,736 A | 8/1993 | Sliwa, Jr. |
| 5,291,812 A | 3/1994 | Yen |
| 5,394,255 A | 2/1995 | Yokota |
| 5,467,675 A | 11/1995 | Dow |
| 5,552,907 A | 9/1996 | Yokota |
| 5,555,473 A | 9/1996 | Seitz |
| 5,600,455 A | 2/1997 | Ishikawa |
| 5,663,802 A | 9/1997 | Beckett |
| 5,719,339 A | 2/1998 | Hartman |
| 5,771,328 A | 6/1998 | Wortman |
| 5,801,889 A | 9/1998 | Meyers |
| 5,814,355 A | 9/1998 | Shusta |
| 5,877,431 A | 3/1999 | Hirano |
| 5,877,432 A | 3/1999 | Hartman |
| 5,919,551 A | 7/1999 | Cobb, Jr. |
| 5,958,799 A | 9/1999 | Russell |
| 6,029,349 A | 2/2000 | Berkhout |
| 6,040,653 A | 3/2000 | O'Neill |
| 6,080,467 A | 6/2000 | Weber |
| 6,110,030 A | 8/2000 | Hashimoto |
| 6,140,655 A | 10/2000 | Russell |
| 6,147,804 A | 11/2000 | Kashima et al. |
| 6,170,367 B1 | 1/2001 | Keller |
| 6,237,452 B1 | 5/2001 | Ludwick |
| 6,253,422 B1 | 7/2001 | Zipp |
| 6,253,442 B1 | 7/2001 | Benson |
| 6,277,471 B1 | 8/2001 | Tang |
| 6,322,236 B1 | 11/2001 | Campbell |
| 6,322,709 B1 | 11/2001 | Krasnoff et al. |
| 6,328,504 B1 | 12/2001 | Kinukawa |
| 6,337,281 B1 | 1/2002 | James |
| 6,354,709 B1 | 3/2002 | Campbell |
| 6,356,391 B1 | 3/2002 | Gardiner |
| 6,379,592 B1 | 4/2002 | Lundin |
| 6,386,855 B1 | 5/2002 | Luttrell |
| 6,487,017 B1 | 11/2002 | Gunn |
| 6,560,026 B2 | 5/2003 | Gardiner |
| 6,570,710 B1 | 5/2003 | Nilsen |
| 6,578,254 B2 | 6/2003 | Adams |
| 6,581,286 B2 | 6/2003 | Campbell |
| 6,585,461 B1 | 7/2003 | Saito |
| 6,597,968 B2 | 7/2003 | Marsumoto |
| 6,618,106 B1 | 9/2003 | Gunn |
| 6,655,654 B1 | 12/2003 | Cotton, III |
| 6,665,027 B1 | 12/2003 | Gunn |
| 6,707,611 B2 | 3/2004 | Gardiner |
| 6,739,575 B2 | 5/2004 | Cotton, III |
| 6,752,505 B2 | 6/2004 | Parker |
| 6,791,764 B2 | 9/2004 | Hosoe |
| 6,811,274 B2 | 11/2004 | Olczak |
| 6,839,173 B2 | 1/2005 | Shimmo |
| 6,844,950 B2 | 1/2005 | Ja Chisholm |
| 6,845,212 B2 | 1/2005 | Gardiner |
| 6,861,649 B2 | 3/2005 | Massie |
| 6,862,141 B2 | 3/2005 | Olczak |
| 6,909,482 B2 | 6/2005 | Olczak |
| 6,925,915 B1 | 8/2005 | Claesson |
| 6,951,400 B2 | 10/2005 | Chisholm |
| 6,952,627 B2 | 10/2005 | Olczak |
| 6,965,476 B2 | 11/2005 | Sato |
| 7,009,771 B2 | 3/2006 | Bourdelais |
| 7,009,774 B2 | 3/2006 | Yoshikawa |
| 7,107,694 B2 | 9/2006 | Yang |
| 7,140,812 B2 | 11/2006 | Bryan |
| 7,142,767 B2 | 11/2006 | Gardiner |
| 7,145,282 B2 | 12/2006 | Oakley |
| 7,180,672 B2 | 2/2007 | Olczak |
| 7,248,412 B2 | 7/2007 | Olczak |
| 7,265,907 B2 | 9/2007 | Hasei |
| 7,290,471 B2 | 11/2007 | Ehnes |
| 7,293,487 B2 | 11/2007 | Campbell |
| 7,298,554 B2 | 11/2007 | Cho |
| 7,328,638 B2 | 2/2008 | Gardiner |
| 7,330,315 B2 | 2/2008 | Nilson |
| 7,350,441 B2 | 4/2008 | Campbell |
| 7,350,442 B2 | 4/2008 | Ehnes |
| 7,364,314 B2 | 4/2008 | Nilson |
| 7,397,605 B2 | 7/2008 | Mai |
| 7,618,164 B2 * | 11/2009 | Wang .................. G02B 5/0221 362/339 |
| 7,653,234 B2 | 1/2010 | Warren |
| 7,852,570 B2 | 12/2010 | Gardiner |
| 7,950,838 B2 * | 5/2011 | Johnson ................ G02B 5/045 349/112 |
| 8,436,960 B2 | 5/2013 | Teragawa |
| 8,517,573 B2 | 8/2013 | Wang et al. |
| 9,810,817 B2 * | 11/2017 | Campbell ............. G02B 5/045 |
| 2001/0053075 A1 | 12/2001 | Parker |
| 2002/0035231 A1 | 3/2002 | Whitehouse |
| 2002/0051866 A1 * | 5/2002 | Mullen ............... B29C 35/0894 428/156 |
| 2002/0154669 A1 | 10/2002 | Spangler |
| 2003/0035231 A1 | 2/2003 | Epstein |
| 2003/0108710 A1 | 6/2003 | Coyle |
| 2003/0112521 A1 | 6/2003 | Gardiner |
| 2003/0223830 A1 | 12/2003 | Bryan |
| 2003/0226991 A1 | 12/2003 | Cotton, III |
| 2004/0035266 A1 | 2/2004 | Montesanti |
| 2004/0045419 A1 | 3/2004 | Bryan |
| 2004/0061959 A1 | 4/2004 | Kim |
| 2004/0069944 A1 | 4/2004 | Massie |
| 2004/0109663 A1 | 6/2004 | Olczak |
| 2004/0120136 A1 | 6/2004 | Olczak |
| 2004/0135273 A1 | 6/2004 | Parker |
| 2004/0190102 A1 | 9/2004 | Mullen |
| 2004/0246599 A1 | 12/2004 | Nilsen |
| 2005/0018307 A1 * | 1/2005 | Kamijima ............... G02B 5/045 359/628 |
| 2005/0024849 A1 | 2/2005 | Parker |
| 2005/0025423 A1 | 2/2005 | Hanaoka |
| 2005/0073220 A1 | 4/2005 | Moler |
| 2005/0141243 A1 | 6/2005 | Mullen |
| 2005/0223858 A1 | 10/2005 | Lu |
| 2005/0280752 A1 * | 12/2005 | Kim .................... G02B 5/0221 349/62 |
| 2006/0055627 A1 | 3/2006 | Wilson |
| 2006/0120816 A1 | 6/2006 | Morimoto |

(56) References Cited

U.S. PATENT DOCUMENTS

| | | | |
|---|---|---|---|
| 2006/0126327 A1* | 6/2006 | Parker | F21V 5/00 362/231 |
| 2006/0204676 A1* | 9/2006 | Jones | B82Y 30/00 428/1.1 |
| 2006/0226583 A1 | 10/2006 | Marushin | |
| 2006/0234605 A1 | 10/2006 | Bryan | |
| 2006/0256444 A1 | 11/2006 | Olczak | |
| 2006/0262667 A1 | 11/2006 | Lah | |
| 2007/0010594 A1 | 1/2007 | Wang et al. | |
| 2007/0039433 A1 | 2/2007 | Bryan | |
| 2007/0084316 A1 | 4/2007 | Trice | |
| 2007/0097492 A1 | 5/2007 | Takasu | |
| 2007/0101836 A1 | 5/2007 | Ostendarp | |
| 2007/0206298 A1 | 9/2007 | Lin | |
| 2007/0221019 A1 | 9/2007 | Ethington | |
| 2007/0279773 A1 | 12/2007 | Johnson | |
| 2008/0055732 A1 | 3/2008 | Lin | |
| 2009/0038450 A1 | 2/2009 | Campbell | |
| 2009/0041553 A1 | 2/2009 | Burke | |
| 2009/0135335 A1 | 5/2009 | Lee | |
| 2009/0147361 A1 | 6/2009 | Gardiner | |
| 2009/0292549 A1 | 11/2009 | Ma | |
| 2011/0032623 A1 | 2/2011 | Ehnes | |
| 2011/0181971 A1 | 7/2011 | Campbell | |
| 2013/0163256 A1 | 6/2013 | Hunt | |

FOREIGN PATENT DOCUMENTS

| | | |
|---|---|---|
| DE | 885163 | 7/1949 |
| EP | 830946 | 3/1998 |
| EP | 1092515 | 4/2001 |
| FR | 967169 | 10/1950 |
| JP | 62-198004 | 12/1987 |
| JP | 63-180401 | 7/1988 |
| JP | 3-280342 | 12/1991 |
| JP | 6-277905 | 10/1994 |
| JP | 6-299373 | 10/1994 |
| JP | H08-304608 A | 11/1996 |
| JP | 9-275689 | 10/1997 |
| JP | 10-044140 | 2/1998 |
| JP | 10-086370 | 4/1998 |
| JP | 10-197423 | 7/1998 |
| JP | 10-277832 | 10/1998 |
| JP | 11-503574 | 3/1999 |
| JP | 11-267902 | 10/1999 |
| JP | 2000-020915 | 1/2000 |
| JP | 2001-161701 | 6/2001 |
| JP | 2001-522729 | 11/2001 |
| JP | 2002-507944 | 3/2002 |
| JP | 2004-004970 A | 1/2004 |
| JP | 2004-098230 | 4/2004 |
| JP | 2005-078005 | 3/2005 |
| KR | 100211930 | 5/1999 |
| KR | 10-2004-096676 | 11/2004 |
| KR | 10-2008-0112846 | 12/2008 |
| KR | 10-2009-0050283 | 5/2009 |
| KR | 10-2009-0058679 | 6/2009 |
| WO | 1989-004052 | 5/1989 |
| WO | 1996-032741 | 10/1996 |
| WO | 1997-001774 | 1/1997 |
| WO | 1997-032227 | 9/1997 |
| WO | WO 1997-048521 | 12/1997 |
| WO | WO 2000-025963 | 5/2000 |
| WO | WO 2000-048037 | 8/2000 |
| WO | WO 2000-050201 | 8/2000 |
| WO | WO 2002-04858 A2 | 1/2002 |
| WO | WO 2002-006005 | 1/2002 |
| WO | WO 2002-037168 | 5/2002 |
| WO | WO 2003-086688 | 10/2003 |
| WO | WO 2005-003851 | 1/2005 |
| WO | WO 2005-043266 | 5/2005 |
| WO | WO 2005-119351 | 12/2005 |
| WO | WO 2007-027521 A1 | 3/2007 |
| WO | WO 2009-146055 | 12/2009 |

OTHER PUBLICATIONS

Adams, "Microgrooving and Microthreading Tools for Fabricating Curvlinear Features"; Precision Engineering, Oct. 2000, vol. 24, issue 4, pp. 347-356.

Information Disclosure Statement—Declaration by Applicant William J. Bryan, dated Aug. 28, 2002, pp. 1.

Ketsu, "Ultra Precision Machining Center and Micro Processing", Chapter 5, Nikkan Kogyo Shimbun Ltd., Jun. 1998, pp. 1-14 (Translation), pp. 73-83.

Krueger, "New Technology in Metalworking Fluids and Grinding Wheels Achieves Tenfold Improvement in Grinding Performance," Coolants/Lubricants for Metal Cutting and Grinding Conference, Chicago, Illinois, Milacron, Inc. and Oak Ridge National Laboratory, Jun. 7, 2000, pp. 1-14.

Marui, "Ultra Precision Cutting Mechanism," Ultra Precision Machining, Sep. 1997, pp. 1-4 (Translation) and pp. 96-99.

Miyamoto, "Ultra fine finishing of diamond tools by ion beams," Precision Engineering, vol. 9, No. 2, Apr. 1987, pp. 71-78.

Picard, "Focused Ion Beam-Shaped Microtools for Ultra-Precision Machining of Cylindrical Components"; Precision Engineering, Jan. 2003, vol. 27, Issue 1, pp. 59-69.

Trent, "Copper, Brass and Other Copper Alloys," Metal Cutting, 4th ed., Butterworth-Heinemann, 2000, pp. 258-260.

UltraMill Research@PEC,NCSU, "Vibration Assisted Machining: Ultramill," North Carolina State University, Precision Engineering Center, Raleigh, NC 27695, [http://airy.pec.ncsu.edu/PEC/research/projects/ultramill/index.html], Spring 2000, pp. 2.

Vasile, "Microfabrication by Ion Milling: The Lathe Technique"; J. Vac. Sci. Technol. B., vol. 12, No. 4, Jul./Aug. 1994, pp. 2388-2393.

Vasile, "Focused Ion Beam Technology Applied to Microstructure Fabrication"; J. Vac. Sci. Technol. B. vol. 16, No. 4, Jul./Aug. 1998, pp. 2499-2505.

Vasile, "Microfabrication Techniques Using Focused Ion Beams and Emergent Applications"; Micron, Jun. 1999, vol. 30, issue 3, pp. 235-244.

Zhang, "Nature of Cutting Force Variation in Precision Cutting", Theory and Technique of Precision Cutting, 1991, Chap. 2, pp. 18-31.

Int'l Search Report for PCT/US2009/039077, dated Jun. 30, 2009, 3 pages.

Written Opinion for PCT/US2009/039077, 5 pages.

Int'l Search Report for PCT/US2009/039072, dated Nov. 17, 2009, 3 pages.

Written Opinion for PCT/US2009/039072, 4 pages.

* cited by examiner

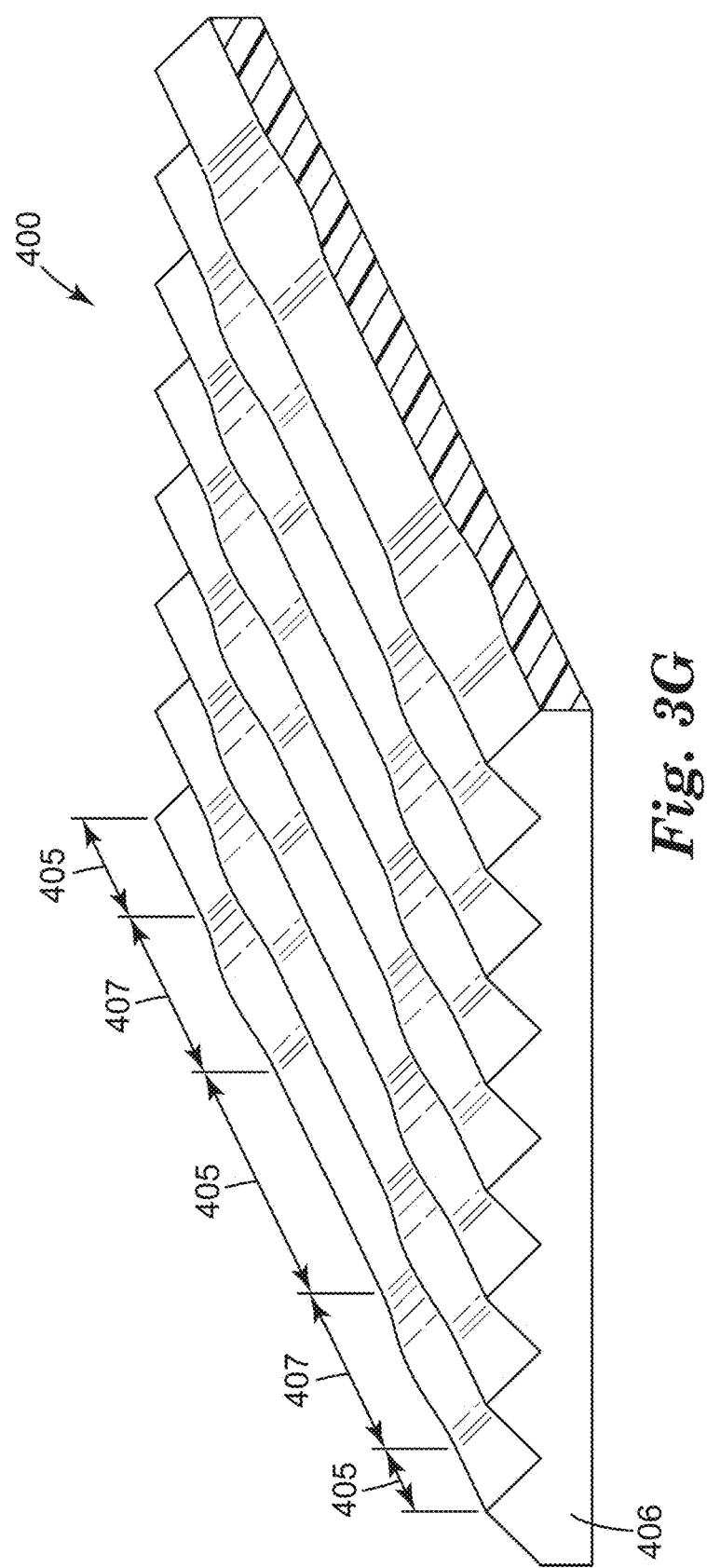

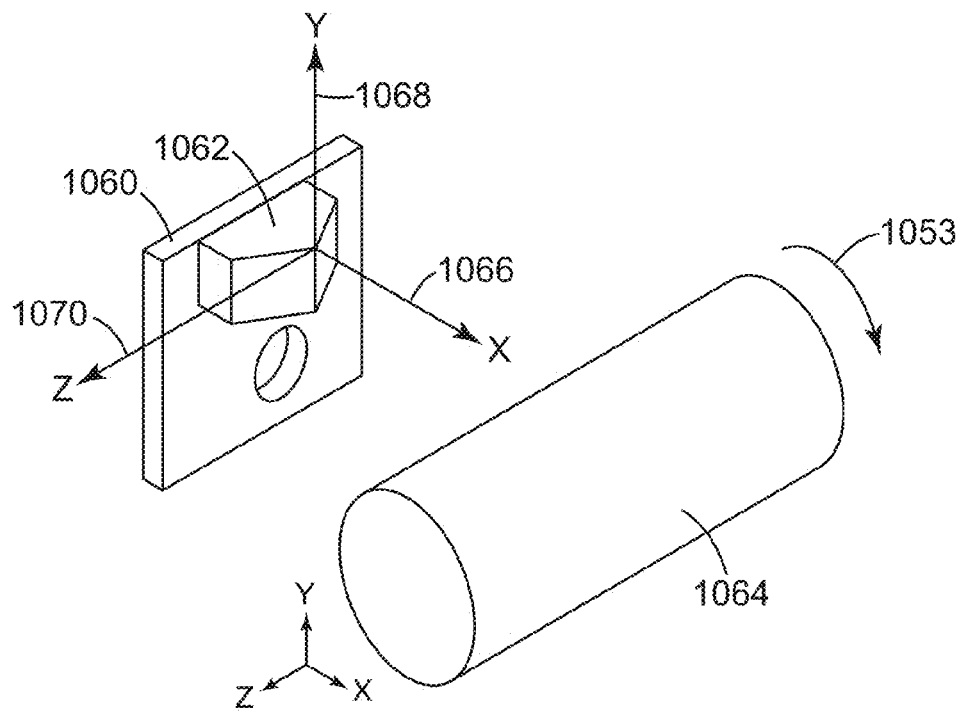
*Fig. 15*
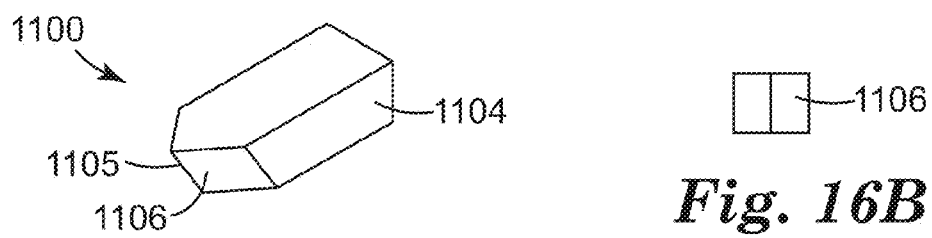
*Fig. 16A*  *Fig. 16B*
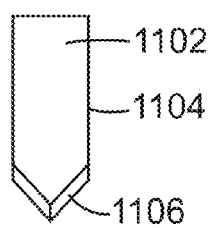 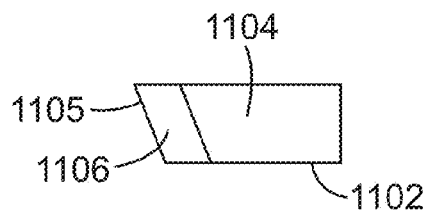
*Fig. 16C*  *Fig. 16D*

LIGHT DIRECTING FILM AND METHOD FOR MAKING THE SAME

CROSS REFERENCE TO RELATED APPLICATIONS

This application is a Continuation of U.S. application Ser. No. 12/934,835, filed on Mar. 25, 2011, which is a National Stage filing under 35 U.S.C. 371 of PCT/US2009/039077, filed on Apr. 1, 2009, which claims priority to U.S. Provisional Application No. 61/041,751, filed on Apr. 2, 2008, the disclosure of which is incorporated by reference in their entirety herein.

TECHNICAL FIELD

The present disclosure is directed generally to a light directing film, and particularly to a film that reduces and/or hides defects and optical coupling in a display while improving the brightness of the display.

BACKGROUND

In backlit displays, brightness enhancement films use structures to direct light along the viewing axis, thus enhancing the brightness of the light perceived by the viewer. A representative example of a light directing film is illustrated in FIG. 1. This film 10 may be manufactured from a suitable polymeric material such as acrylic, polycarbonate, UV-cured acrylate, or like material and has a smooth surface 14 and a structured surface 12 opposite the smooth surface. The structured surface 12 includes an array of linear prism elements 16 arranged side by side to form a plurality of peaks 17 and grooves 18 running the length of the film. In use, light incident upon the smooth surface 14 of this film at relatively high incidence angles is refracted at the smooth surface 14 and the structured surface 12 of the film and is redirected toward an axis which is perpendicular to the smooth surface 14. Additionally, light which strikes the structured surface 12 at greater than the critical angle undergoes total internal reflection from both side surfaces, or facets, 20 of a prism element 16 and is directed back, where it may be recycled by reflective elements. By a combination of reflection, refraction and total internal reflection, the film 10 increases the amount of light directed on axis and decreases the amount of light directed at high angles.

A second sheet of light directing film may be placed closely adjacent the first sheet with the prism elements crossed at approximately 90 degrees to further increase the amount of light directed along the viewing axis. FIG. 2 illustrates, in an exploded view, the orientation of crossed sheets of light directing film. In use, the lower, smooth surface 14' of the upper sheet 10' can contact, or very nearly contact, the structured surface 12 of the lower sheet 10.

However, if the displays are viewed closely for long periods of time, even very small defects may be detected by the naked eye, and cause distraction for the viewer. For example, "wet-out" occurs when two surfaces optically contact each other, which causes a variation in light intensity across the display surface area. Brighter areas correspond to areas where there is optical coupling and the less bright areas correspond to less optical coupling, and this variation causes a display to have a non-uniform appearance.

SUMMARY

Advances in technology, particularly for the small displays utilized in hand-held devices, require further development of optical films to more effectively hide display defects while substantially maintaining display brightness. For example, increased LCD panel transmission, reduced diffusion in the LCD panel and backlight, as well as small spacing tolerances and extremely thin backlight structures in hand held devices, can cause smaller scale display defects that conventional patterned films cannot effectively prevent and/or mask.

The light directing films described in the present disclosure include a microstructured surface with an arrangement of microstructures thereon. Each microstructure on the surface includes a first region with a substantially constant height and a second region with a non-constant height. The maximum height of the second region is greater than the constant height of the first region, and the first regions and the second regions have the same cross-sectional shape.

The height of the second regions is selected to reduce optical coupling between the microstructured surface and another display component, which prevents large areas of wet out and reduces the occurrence of visible lines in a display incorporating the optical film. The period between the second regions on each microstructure and/or the density of the second regions on the microstructured surface are selected to provide this reduction in optical coupling while substantially preserving the optical gain of the film. Since the first regions and the second regions have the same cross-sectional shape, the microstructured surface is readily reproducible, which makes the films less expensive to manufacture than films with more complex randomized patterns.

In one aspect, the present disclosure is directed to a light directing film including a structured major surface. The structured major surface includes a plurality of microstructures extending along a first direction. A microstructure includes a first region with a constant height, and a second region adjacent to the first region, wherein the second region has a non-constant height and a maximum height greater than the constant height of the first region. The first region and the second region have the same lateral cross sectional shape.

In another aspect, the present disclosure is directed to a light directing article including a first sheet of light directing film. The first sheet of light directing film includes a structured major surface, wherein the structured major surface includes a plurality of microstructures extending along a first direction. A microstructure includes a first region and a second region, wherein the second region is different from and adjacent to the first region. A microstructure has a substantially constant height in the first region and a maximum, non-constant height in the second region about 0.5 to about 3 microns greater than the constant height in the first region. The first region and the second region have the same lateral cross sectional shape.

The light directing article further includes a second sheet of light directing film having a substantially planar surface and a structured surface opposite the substantially planar surface. The substantially planar surface is adjacent the structured surface of the first sheet of light directing film. The structured surface of the second sheet of light directing film includes a plurality of microstructures extending along a second major axis approximately perpendicular to the first major axis. Any optical coupling between the first and second sheets occurs predominantly in the second regions.

In yet another aspect, the present disclosure is directed to an optical display including a light source; a viewing screen; and a light directing film that directs light from the light source to the viewing screen. The light directing film has a first major surface; and a structured second major surface including a plurality of microstructures. A microstructure has a repeating pattern that includes a first region and an adjacent second region. The first region has a constant height; and the second region has a non-constant, maximum height greater than the substantially constant height of the first regions. The maximum height of the second regions is about 0.5 µm to about 3 µm greater than the constant height of the first regions. The repeating pattern has a feature density of at least 200 second regions per cm$^2$; and the first region and the second region have a same lateral cross sectional shape.

In yet another aspect, the present disclosure is directed to a method of making a light directing film, including cutting a tool with a structured major surface, wherein the structured major surface includes a plurality of grooves extending along a first direction. A groove includes a first region and a second region, wherein the second region is different from and adjacent to the first region. The first regions have a substantially constant height, and the second regions have a maximum height greater than the substantially constant height in the first region. The first region and the second region have the same lateral cross sectional shape. The method further includes applying a polymeric material to the tool to form a film, wherein the film including an arrangement of microstructures corresponding to the grooves in the tool.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3G is a schematic perspective view of a portion of a light directing film including microstructures with a regular distribution of second regions;

FIG. 15 is a diagram illustrating a coordinate system for a cutting tool;

FIG. 16A is a perspective view of a tool tip;

FIG. 16B is a front view of a tool tip;

FIG. 16C is a bottom view of a tool tip;

FIG. 16D is a side view of a tool tip;

DETAILED DESCRIPTION

Figure 3A:
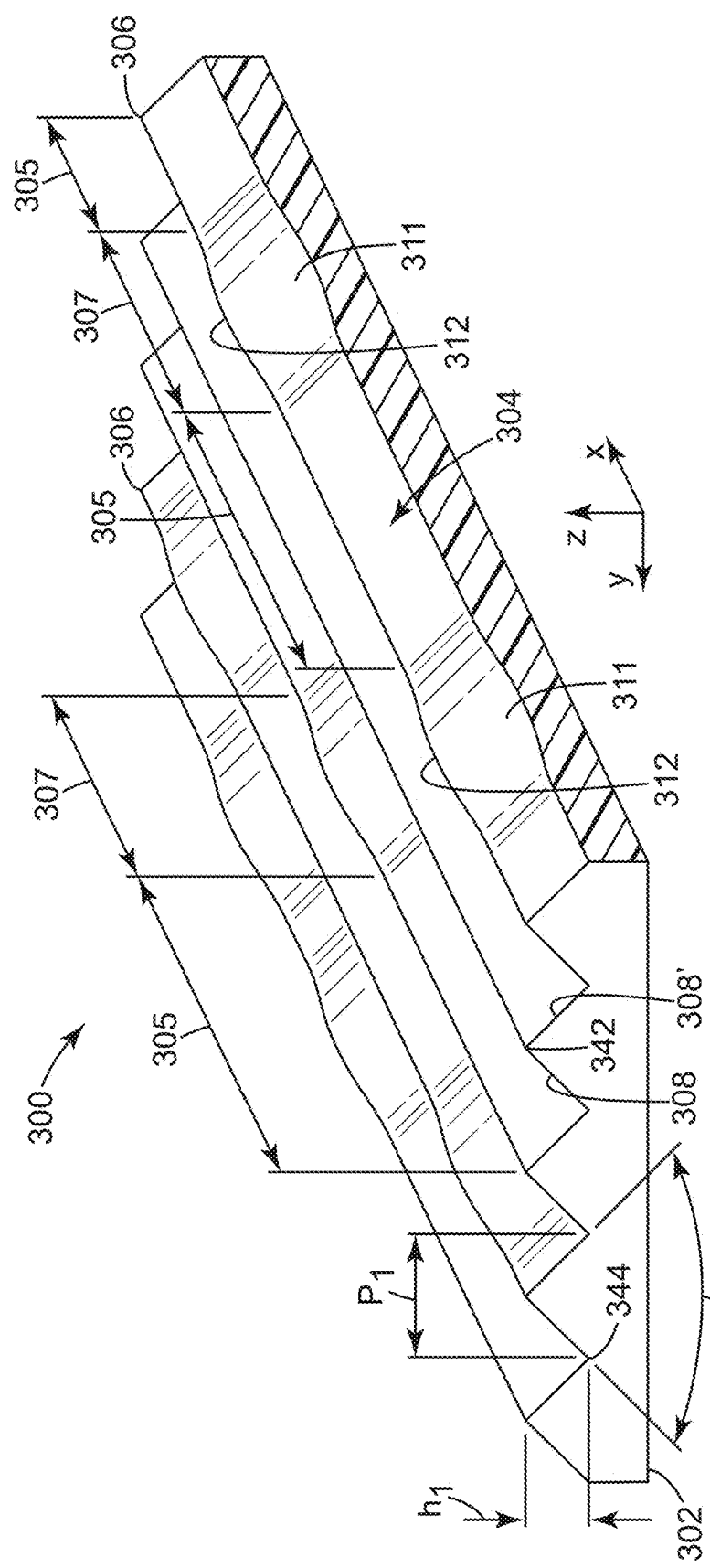
FIG. 3A is a schematic perspective view of a portion of a light directing film including a substantially continuous pattern of microstructures, each microstructure including first and second regions.

FIG. 3A illustrates a portion of one embodiment of a light directing optical film 300 including an arrangement of microstructures designed to reduce or substantially eliminate wet out, while substantially preserving the optical gain of the film when the film is used in a display device. The film 300 includes a first major surface 302 and an opposed structured major surface 304. In the embodiment shown in FIG. 3A the first major surface 302 is substantially smooth, which in this application means substantially optically flat. However, even a substantially optically optically flat surface 302 can optionally include a pattern of small structures to produce haze. The surface 302 can optionally include patterns of microstructures to achieve a desired optical effect (not shown in FIG. 3A).

Figure 3B:
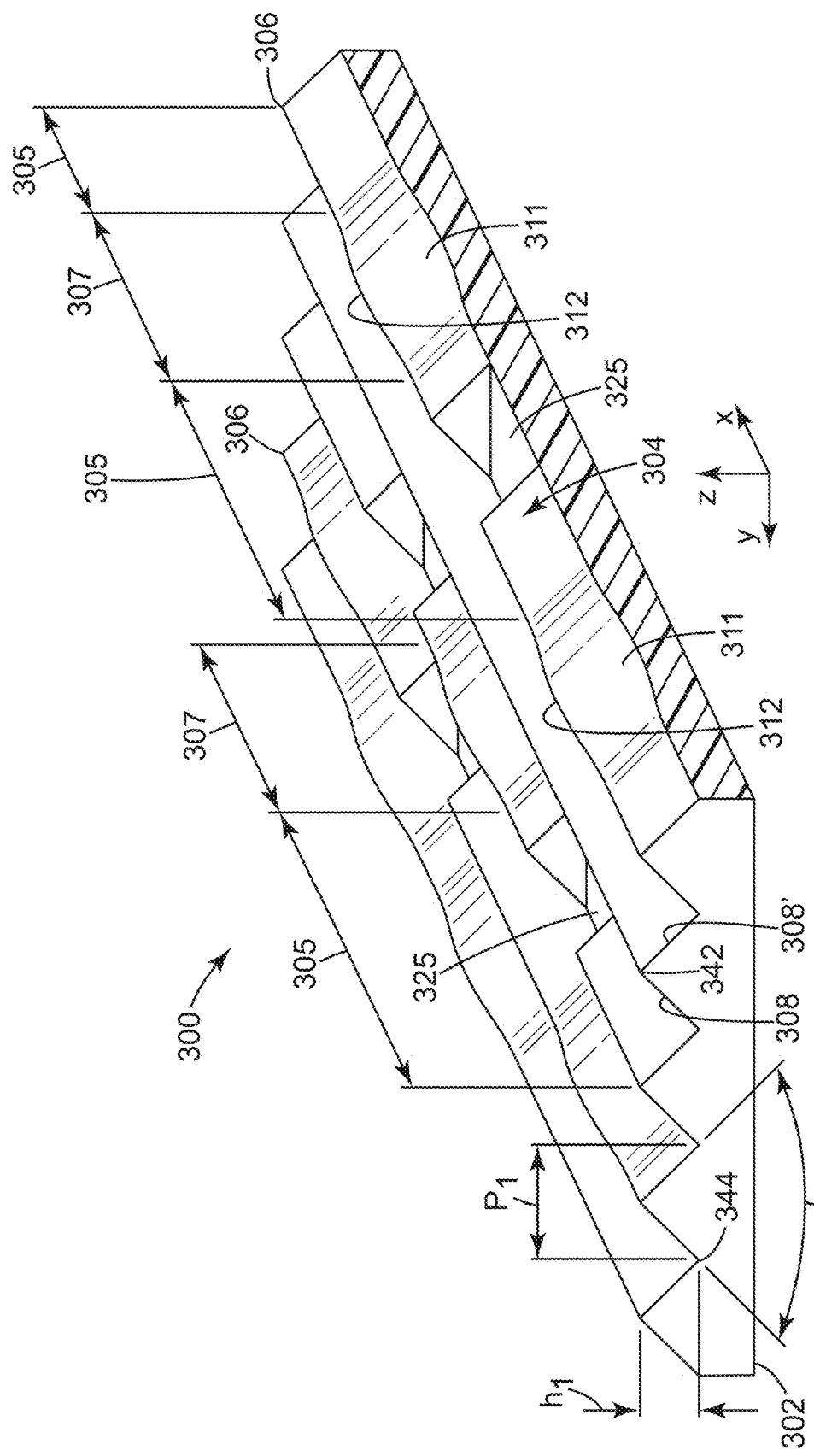
FIG. 3B is a schematic perspective view of a portion of a light directing film including a discontinuous pattern of microstructures, each microstructure having first and second regions.

The structured surface 304 includes a substantially continuous pattern of microstructures 306 that extend along a first axial direction designated x in FIG. 3A and having a substantially constant height $h_1$. In the embodiment shown in FIG. 3A, the microstructures 306 are linear prism elements, each with a first side surface 308 and a second side surface 308.' However, as shown in FIG. 3B, the microstructures 306 need not be continuous, and the surface 304 may include areas 325 without microstructures.

Referring again to the embodiment shown in FIG. 3A, the edges of the side surfaces 308, 308' intersect to define a peak, or apex 342. In the embodiment illustrated in FIG. 3A the side surfaces 308, 308' of adjacent prism elements intersect to form a linearly extending groove 344 between prism elements. However, it is not required that the side surfaces 308, 308' of the prism elements 306 intersect, so the grooves 344 may be made wider as necessary for a particular application. The average pitch $P_1$ of the microstructures 306 can vary widely from about 5 µm to about 300 µm, although average pitches of about 15 µm to about 100 µm have been found to be particularly useful. Although the pitch $P_1$ is preferably substantially the same between all the prism elements 306, such an arrangement is not required, and the pitch $P_1$ may not be constant over the entire surface 304.

Each of the plurality of microstructures 306 in the pattern includes at least one first region 305 and at least one second region 307, and may optionally include other regions as necessary for a particular application (other regions are not shown in FIG. 3A, but see, for example FIG. 6 and the discussion below). The second regions 307 in each microstructure 306 are adjacent the first regions 305 along the length of each microstructure. In some embodiments, the first regions 305 are disposed between two second regions 307.

Figure 3C:
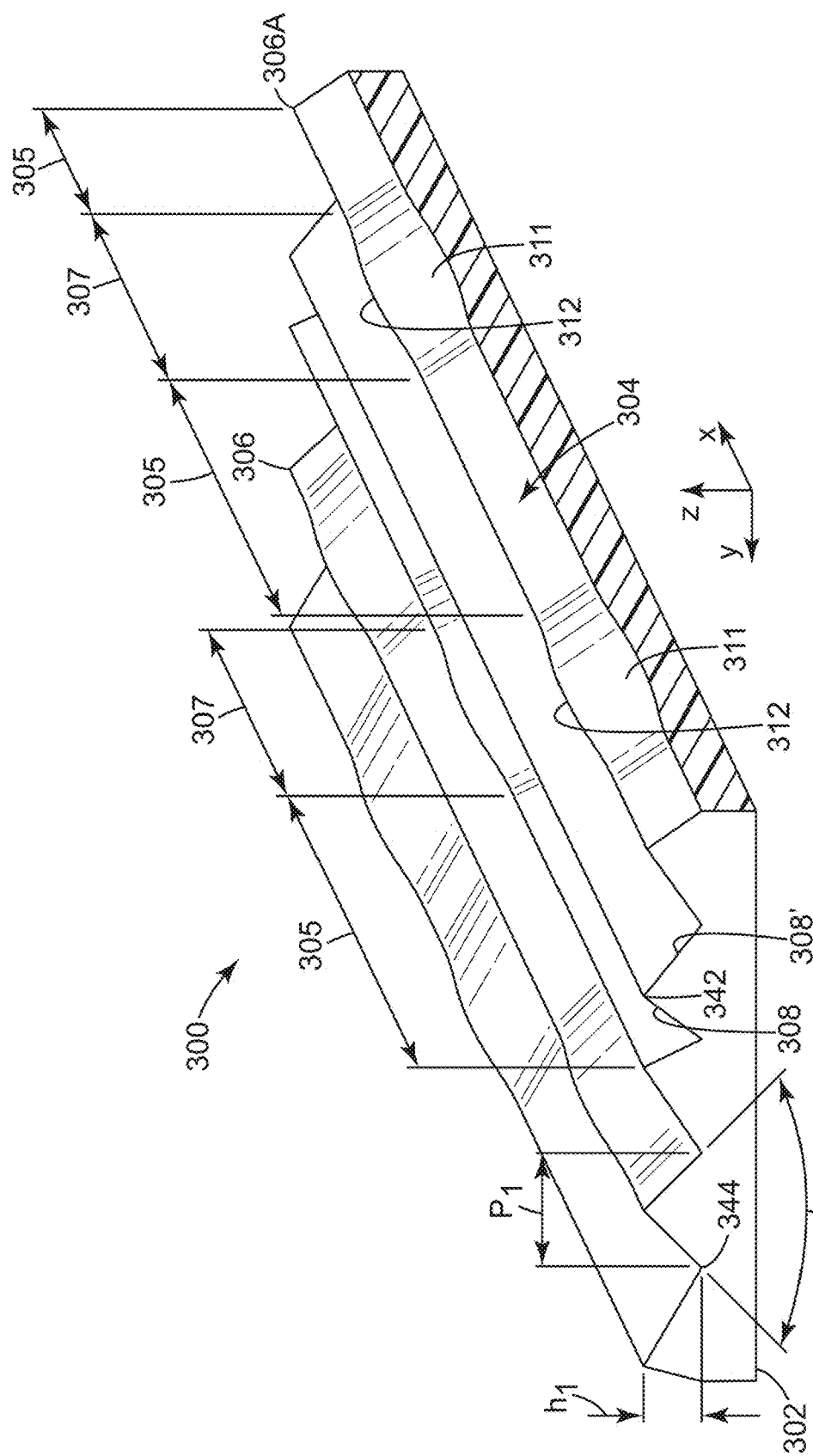
FIG. 3C is a schematic perspective view of a portion of a light directing film including prismatic microstructures with a triangular cross section and tilted axes, each microstructure having first and second regions.

The cross-sectional shape of the microstructures in the first region 305 can vary widely depending on the intended application of the film 300, and is not limited to prismatic shapes. The cross-sectional shape of the first regions 305 can include, but are not limited to, triangles, circles, lenticular shapes, ellipses, cones, or asymmetric shapes having a curved portion. However, to maximize optical gain of the film 300 a generally triangular cross-sectional shape is preferred, and a right isosceles triangular cross sectional shape is particularly preferred. The apexes of the triangles in the cross sections in the first regions 305 or the intersecting regions between the microstructures 306 may be smoothed or curved to alter the shapes of the microstructures or the adjacent grooves and provide desired optical effects, although such shapes generally reduce the gain provided by the microstructures. As shown in FIG. 3C, the principal axes of the microstructures 306A may also be tilted to achieve a desired optical effect.

In the embodiment illustrated in FIG. 3A, the dihedral angle $\alpha_1$ of each triangular cross section in the first region 305 is approximately 90°, although dihedral angles $\alpha_1$ of 70-110° have been found to be useful for most applications.

The first regions 305 have a substantially constant height $h_1$. The height $h_1$ can vary from of about 1 µm to about 175 µm as measured from a plane between the structured surface 304 and the opposed major surface 302 and closest to the structured surface 304 (for example, reference plane 320 in FIG. 3A). While it is generally preferred that the height $h_1$ of the first regions is substantially the same, some variation in height can be tolerated while maintaining good optical performance. For example, in some embodiments, the average height $h_1$ can vary by ±0.20 µm, while in other embodiments the average height hi can vary by ±0.10 µm, and in yet other embodiments the average height $h_1$ can vary by ±0.05 µm, while maintaining acceptable optical performance.

A second region 307 of each microstructure 306 is adjacent to the first region 305. In some embodiments, the second regions are dis-contiguous with respect to the first regions 305, which in this application means that the second regions 307 do not contact or overlap with one another on a microstructure 306. The second regions 307 may be arranged on the surface 304 in a wide variety of patterns, depending on the intended application. For example, the second regions 307 may be randomly distributed on the surface 304, or the distribution may be semi-random (some areas of random distribution, and some areas of regular distribution with some limitations such as a minimum period between microstructures). The second regions 307 may also be regularly distributed on the surface 304, and the regular distributions may be periodic (repeat at a constant interval) or aperiodic (follows a pattern that is not random). An exemplary regular distribution is shown in the film 400 of FIG. 3G, which includes a regular distribution of first regions 405 and second regions 407 across the surface 404 of the film (see also FIG. 12 for another depiction of a regular distribution of second regions).

The second regions 307 have an average density of about 200 per $cm^2$ up to about 6000 per $cm^2$ of the structured surface 304. In some embodiments, the second regions have an average density of about 200 per $cm^2$ to about 3500 per $cm^2$ of the structured surface 304. In other embodiments, the second regions 307 have an average density of about 200 per $cm^2$ to about 2500 per $cm^2$ of the structured surface 304.

The second regions 307 have an average period $P_2$ (see, for example, FIG. 4A) along a microstructure 306 of about 1000 µm to about 20,000 µm. In some embodiments, the second regions 307 have an average period of about 3500 µm to about 15,000 µm. Although the average period $P_2$ of the second regions 307 is preferably substantially the same, such an arrangement is not required.

Figure 3D:
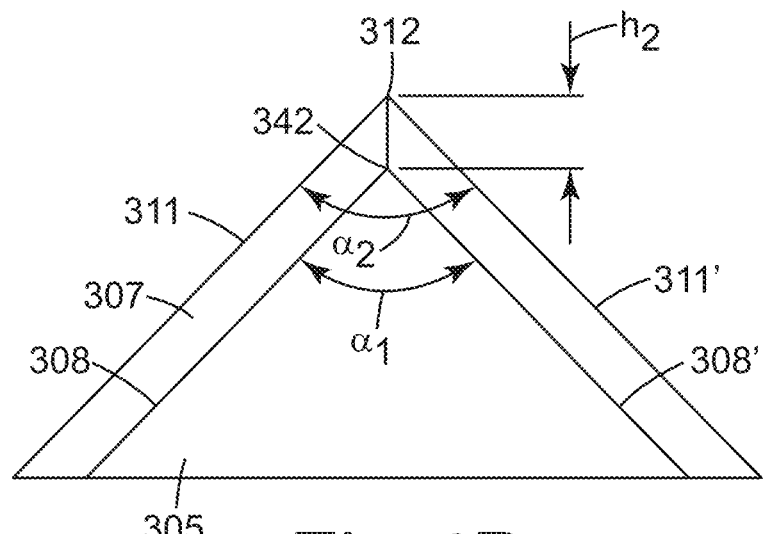
FIG. 3D is a cross-sectional view of a portion of a microstructure on The method of FIG. 3A.
Figure 3E:
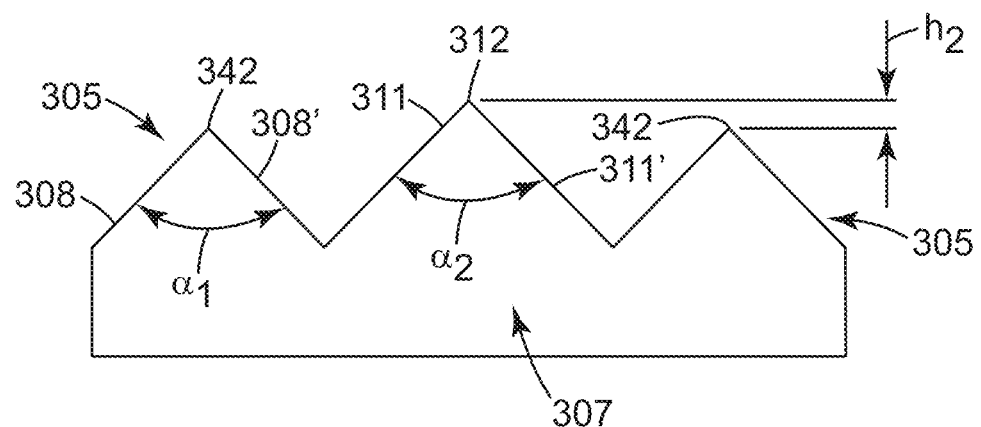
FIG. 3E is a cross-sectional view of an area of The method of FIG. 3A, showing adjacent microstructures.

Referring to the cross-sectional view of a single microstructure 306 in FIG. 3D, the second regions 307 have substantially the same cross-sectional shape as the first regions 305, but are simply taller (extend further along the z direction in FIG. 3A by a distance $h_2$). For example, in the embodiment shown in FIG. 3D, the first regions include side surfaces 308, 308', which meet at an apex 342 and form a dihedral angle $\alpha_1$. The second regions 307 include side surfaces 311, 311,' which meet to form an apex 312 and form a dihedral angle $\alpha_2$. The dihedral angle $\alpha_2$ and a cross-sectional shape of the second regions 307 are substantially the same as the dihedral angle $\alpha_1$ and the cross sectional shape of the first region 305, i.e. $\alpha_2=\alpha_1$. FIG. 3E, which shows a cross section of three adjacent microstructures 306 in an area of the microstructured surface including a second region 307, also illustrates that the second regions 307 have substantially the same cross-sectional shape as the first regions 305, but are taller by a distance $h_2$.

Figure 3F:
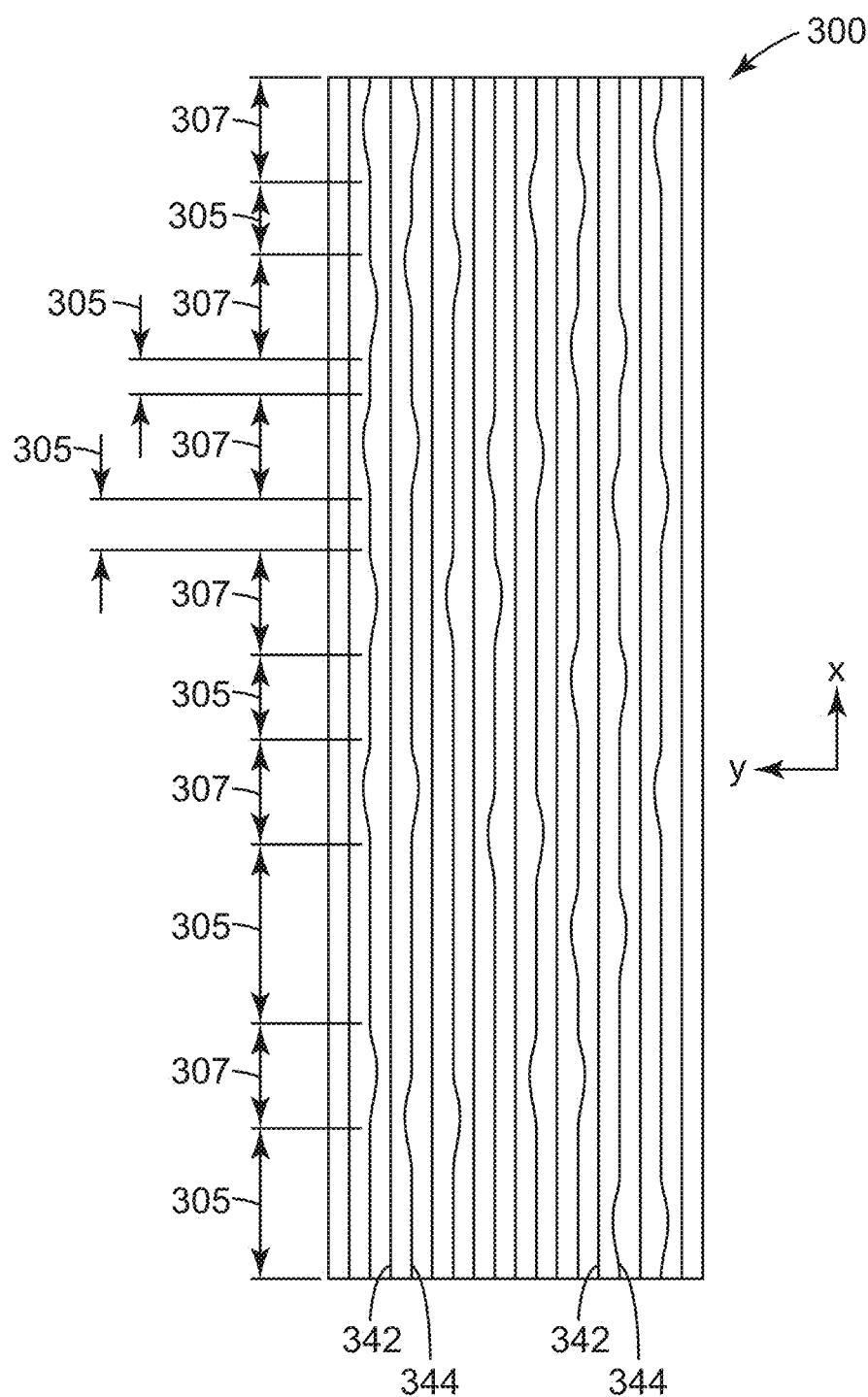
FIG. 3F is an overhead view of The method of FIG. 3A.

This similarity in cross-sectional shape, along with the difference in apex height, causes the side surfaces 311, 312 on the second regions 307 to appear on overhead views to extend or bulge outward in they direction along the microstructures 306 (FIG. 3F). In FIG. 3F, the apexes 342 of the first regions appear as substantially straight lines, while the grooves 344 between the microstructures 306 appear to deviate from linearity at the locations of the second regions 307.

Referring again to FIG. 3D, the second regions have a maximum height $h_2$, measured from the apex 342 of a first region 305 to an apex 312 of a second region 307, of about 0.5 µm to about 3 µm. In some embodiments, the maximum height of the second regions $h_2$ is about 1 µm to about 2.5 µm, while in other embodiments the maximum height $h_2$ is about 1.5 µm to about 2 µm. While the maximum height $h_2$ of all the triangular elements in the second region 307 may be substantially the same, the height $h_2$ of the prism elements 307 can vary in a regular or a random manner to provide a desired optical effect.

Figure 4A:
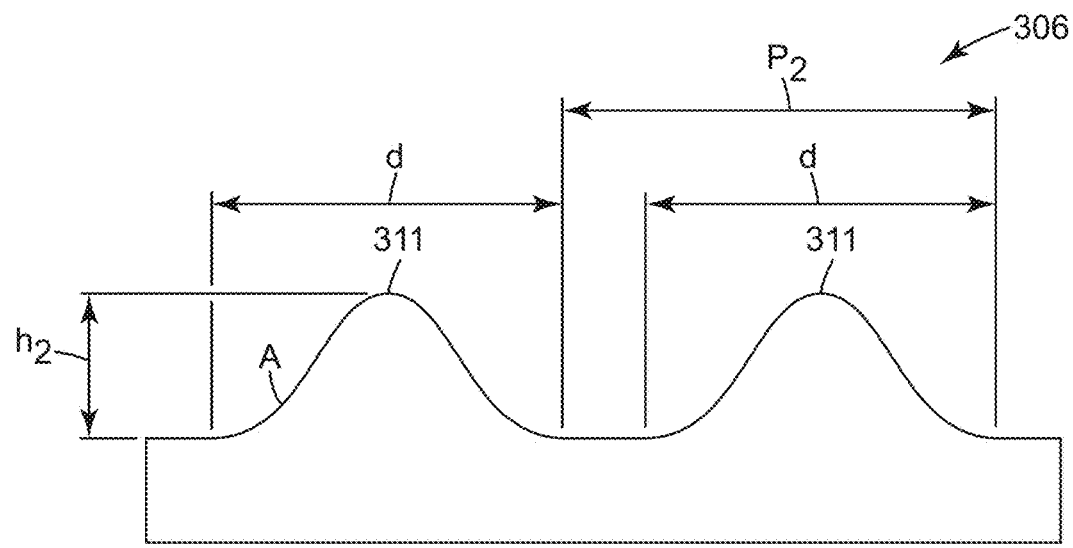
FIG. 4A is a schematic cross-sectional view of a portion of a microstructure on a light directing film and showing substantially continuous second regions.
Figure 4B:
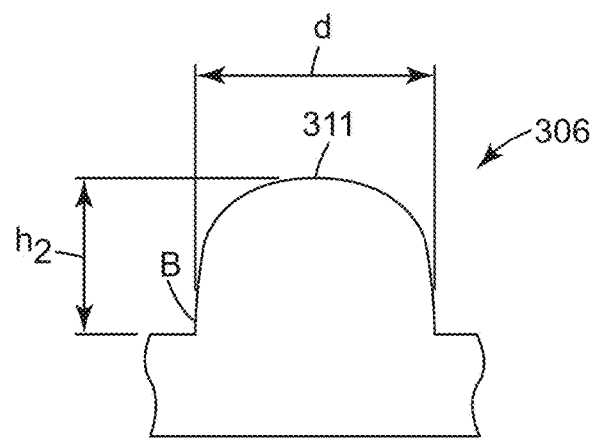
FIG. 4B is a schematic cross-sectional view of a portion of a microstructure on a light directing film and showing a discontinuous second region.

FIGS. 4A-4B illustrate a second region 307 on a microstructure 306. Even if the height $h_2$ of a second region 307 remains relatively constant, the distance d over which the second region rises to its apex 311 may also vary widely. For example, in FIG. 4A, the slope of the line A forming the second region changes smoothly and gradually from a neighboring region, which forms a substantially continuous bump-like region on the microstructure 306. In FIG. 4B, the slope of the line B forming the second region changes more abruptly than the line A in FIG. 4A, and forms a substantially discontinuous bump on the microstructure 306.

In use, when a second surface, such as a sheet of light directing film, is placed adjacent the structured surface 304, its physical proximity to sheet 300 is limited by the second regions 307 of the microstructures 306. The second regions 307 prevent the second surface from contacting the first regions 305 of the microstructures 306, which can reduce optical coupling. For example, one or all of properties such as the average density, average period, and the maximum height of the second regions 307 on the surface 304, as well as the material making up the film carrying the structured surface 304, can be selected such that the second sheet of film is not allowed to sag and contact the first regions 305. Thus, utilizing randomly occurring second regions on each microstructure to physically control the proximity of an adjacent surface dramatically reduces the surface area of the structured surface 304 that is susceptible to undesired optical coupling. Instead, optical coupling occurs primarily within the second regions 307.

Figure 5A:
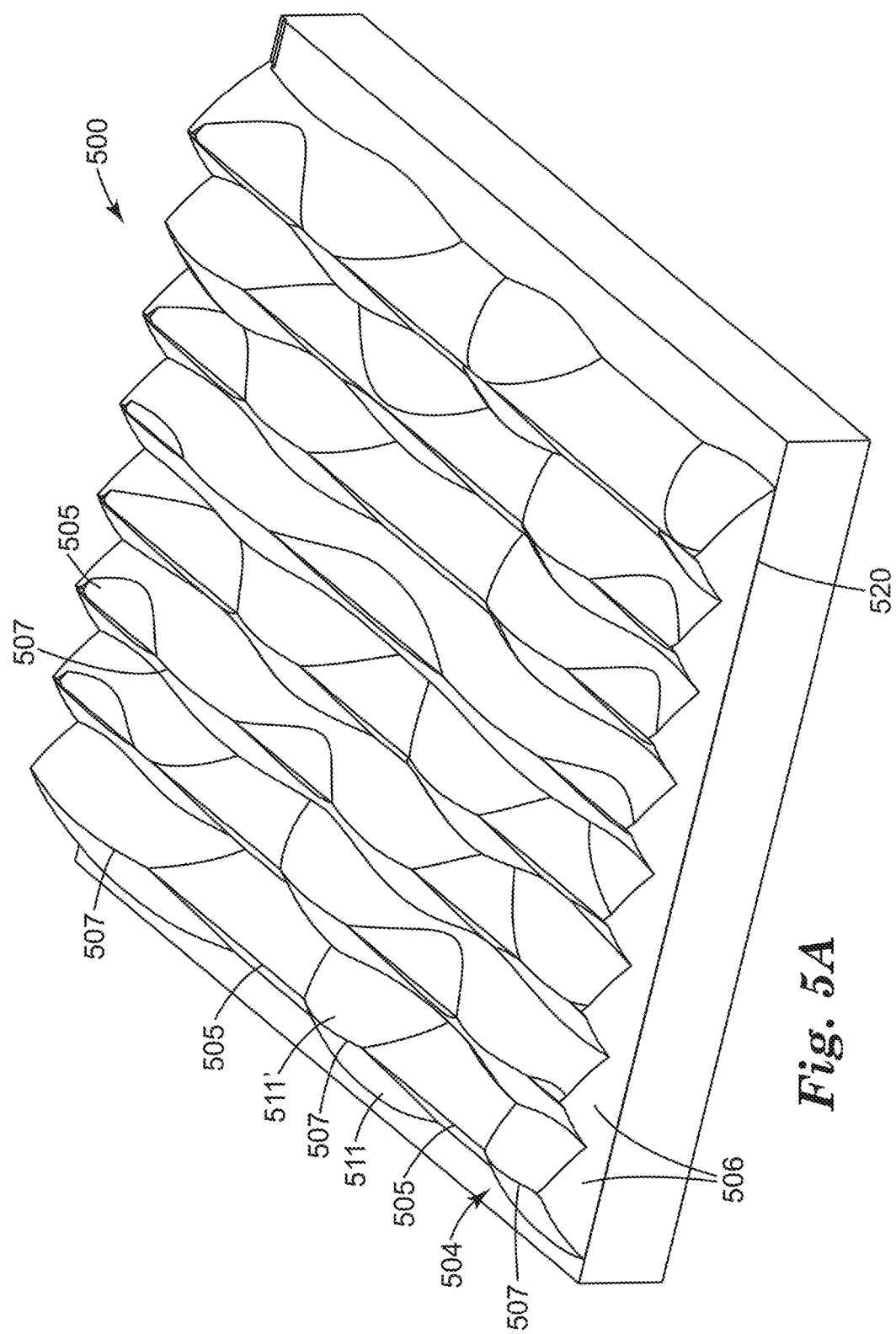
FIG. 5A is a schematic perspective view of a portion of a light directing film including microstructures with lenticular second regions.
Figure 5B:
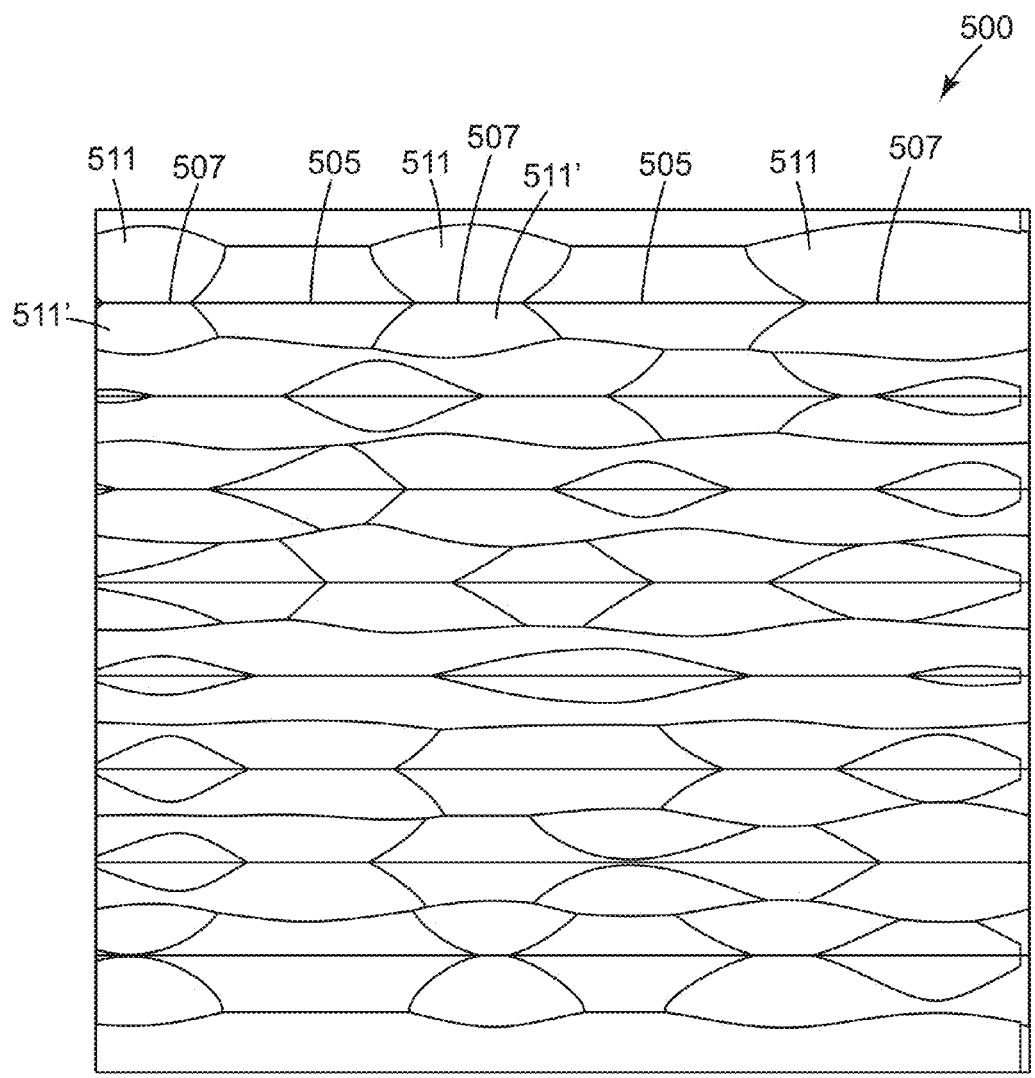
FIG. 5B is a schematic overhead view of a portion of the film of FIG. 5A.
Figure 6:
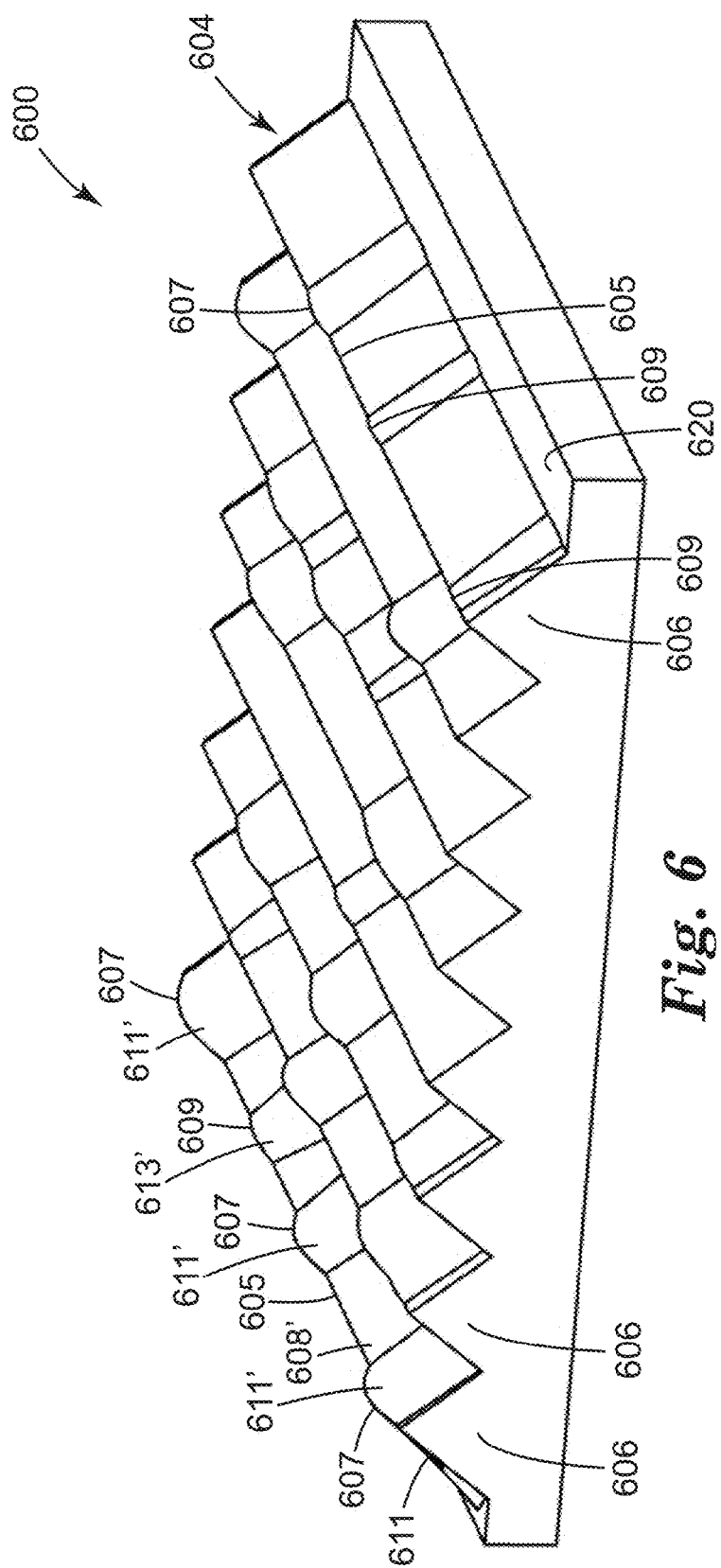
FIG. 6 is a schematic perspective view of a portion of a light directing film including microstructures with first, second a third regions.

FIGS. 5-6 are directed to examples of other useful light directing films. Referring to FIGS. 5A-5B, a light directing film 500 includes a structured surface 504 including microstructures 506. The microstructures 506 each include at least one first region 505 and at least one second region 507. Each first region 505 has a substantially constant height with respect to a reference plane 520, and each second region 507 has a maximum height greater than the substantially constant height of the first regions 505. In the embodiments shown in FIGS. 5A-5B, the second regions 507 include first and second side surfaces 511, 511' that form a generally lenticular shape.

In another embodiment shown in FIG. 6, a light directing film 600 includes a structured surface 604 with microstructures 606. The microstructures 606 each include at least one first region 605, at least one second region 607, and at least one third region 609. Each first region 605 has a substantially constant height with respect to a reference plane 620, and each second region 607 has a maximum height greater than the substantially constant height of the first regions 605. Each third region 609 has a maximum height greater than the substantially constant height of the first regions 605 but less than the maximum height of the second regions 607. Such an arrangement may be useful, for example, to reduce optical coupling caused when an adjacent film sags in the areas between the second regions 607. In the embodiment shown in FIG. 6, the second and third regions are substantially discontinuous (see schematic diagram in FIG. 4B). Compared to the relatively smooth curves at the interfaces between the first regions 305 and the second regions 307 in the microstructures of FIG. 3A, which are referred to herein as continuous (see also schematic diagram in FIG. 4A), the interfaces between side surfaces 611, 611' and 613, 613' and the side surfaces 608, 608' in FIG. 6 is very abrupt, which is referred to herein as a discontinuous structure.

Figure 7:
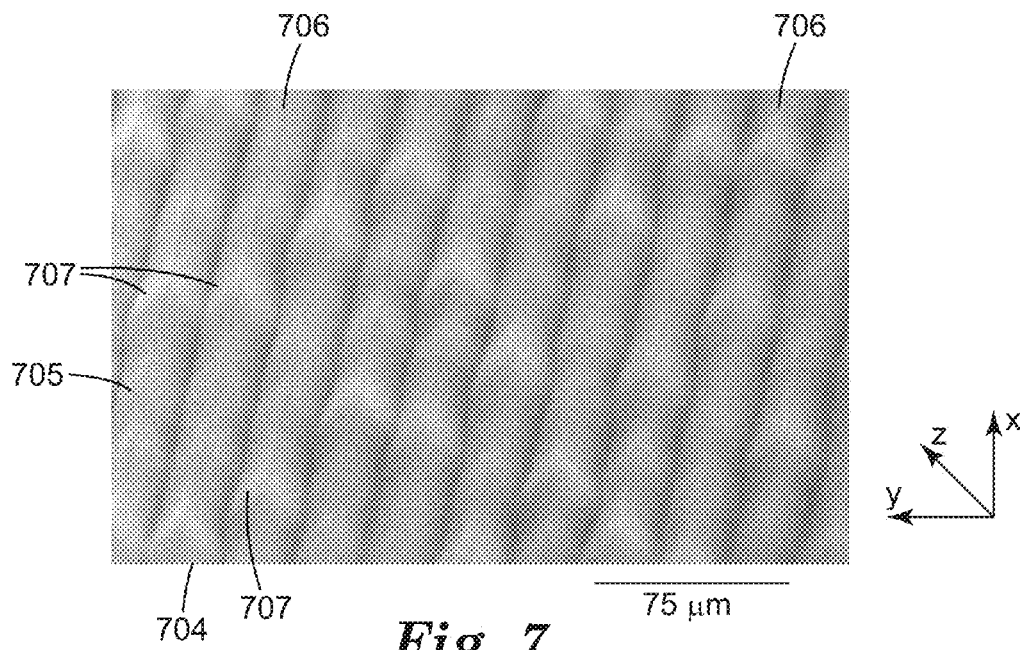
FIGS. 7-9 are photomicrographs at increasing magnification showing perspective views of a light directing film including microstructures with a random arrangement of second regions.
Figure 8:
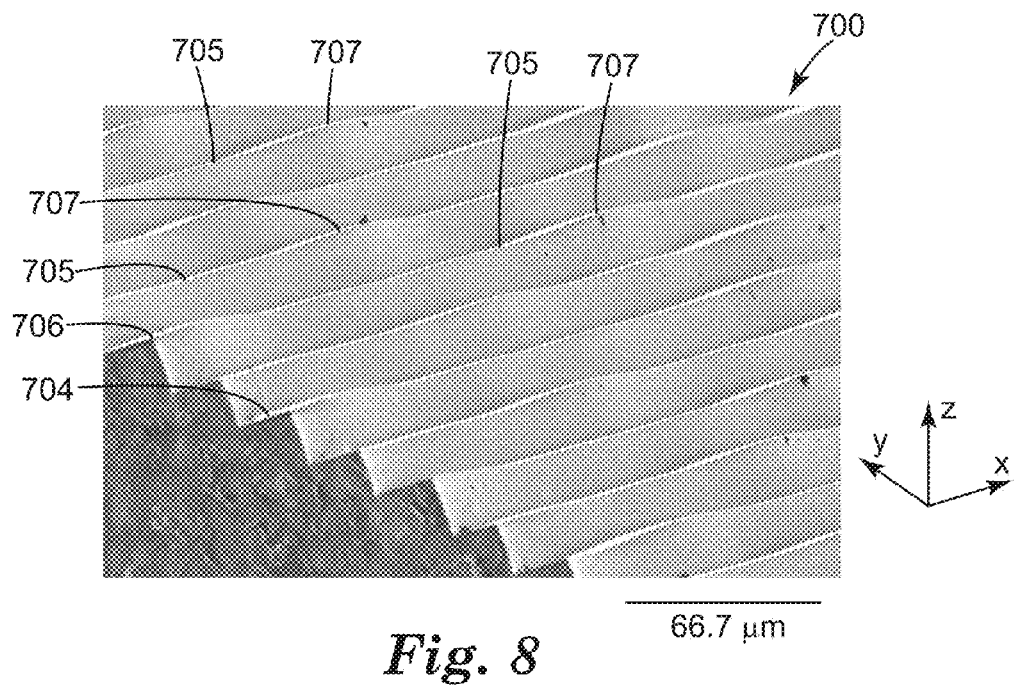
Figure 9:
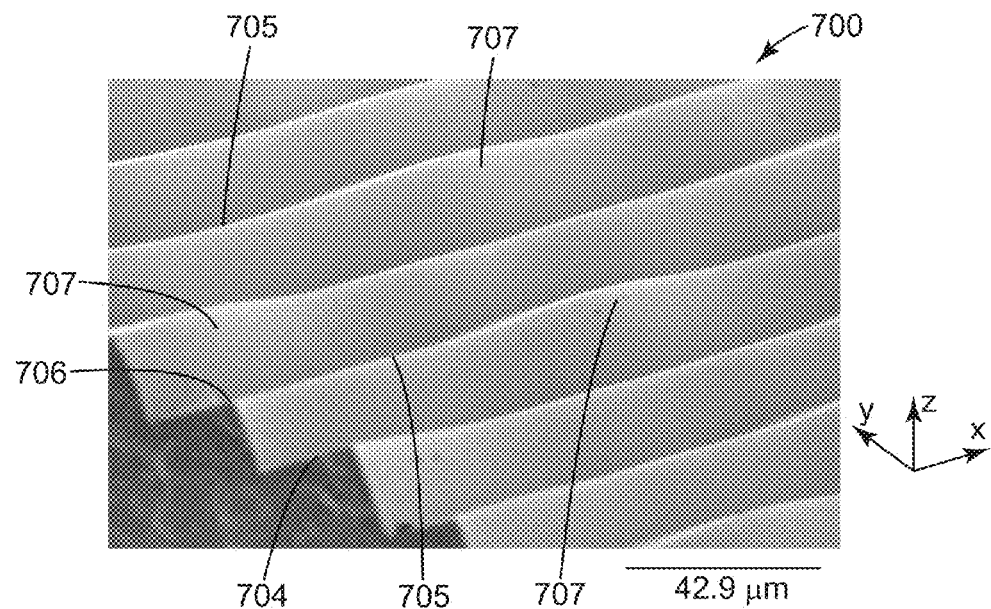
Figure 10:
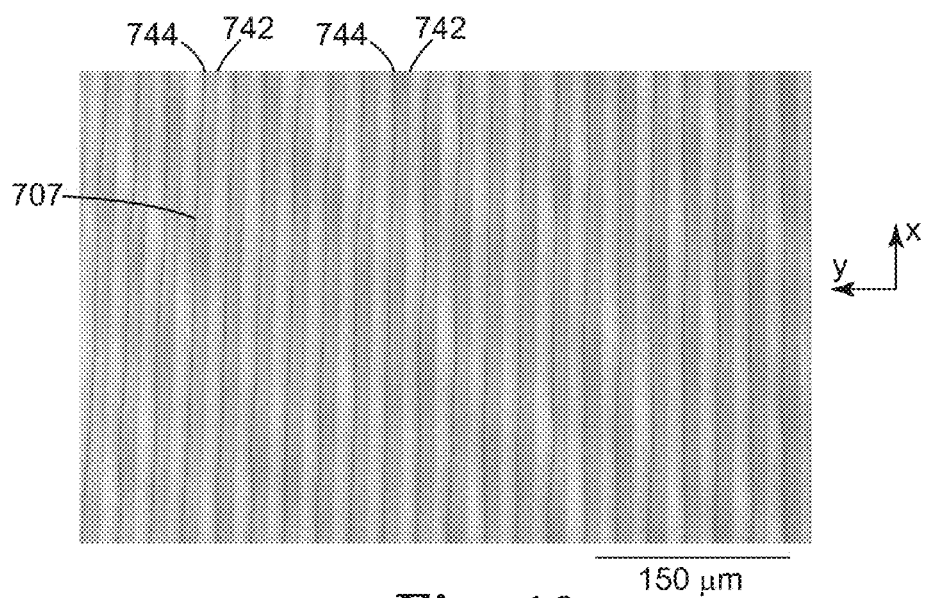
FIGS. 10-11 are photomicrographs at increasing magnification showing overhead views of The method of FIGS. 7-9.
Figure 11:
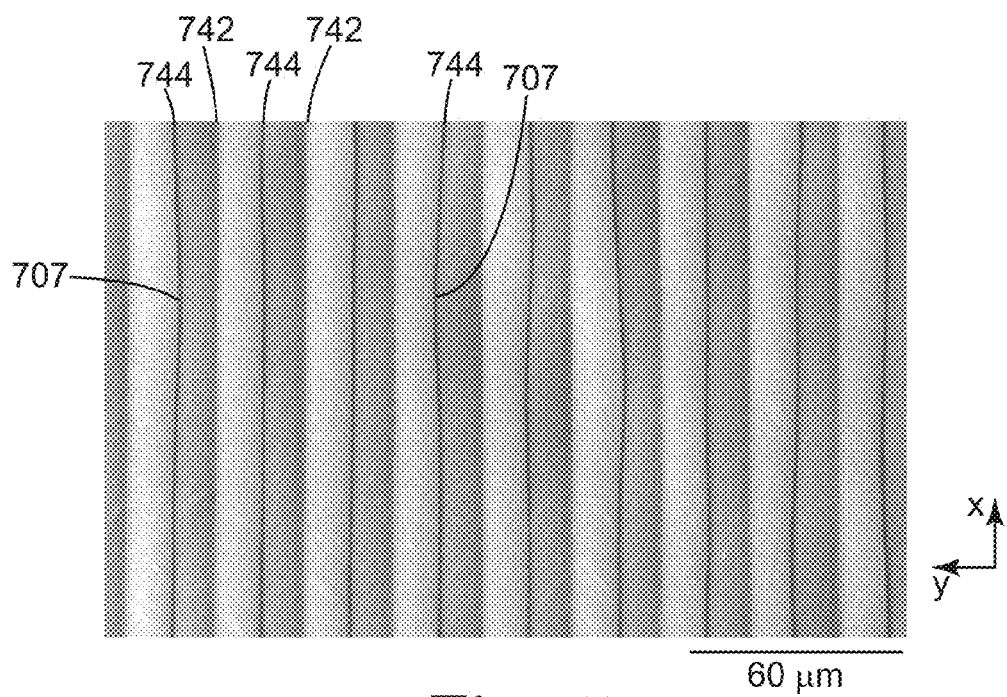

FIGS. 7-9 are photomicrographs that illustrate additional exemplary embodiments of the light directing films as described herein. FIGS. 7-9 show three views at increasing magnification of a portion of a light directing film 700 with a structured surface 704 including continuous prismatic microstructures 706 extending along the x direction. The microstructures 706 include first regions 705, which appear as dark bands or darker areas, as well as a random distribution of second regions 707, which appear as lighter colored bands. The second regions 707 have a maximum height along the z direction that is greater than the substantially constant height of the first regions 705. The second regions 707 also extend outwardly along the y direction so that their triangular cross sectional profile remains the same as the cross sectional profile of the first regions 705. FIGS. 10-11 are additional overhead views at increasing magnification of the embodiments of the light directing films 700 shown in FIGS. 7-9. As in FIG. 3F, the apexes 742 of the first regions appear as substantially straight lines, while the grooves 744 between the microstructures 706 appear to deviate from linearity at the locations of the second regions 707.

Figure 12:
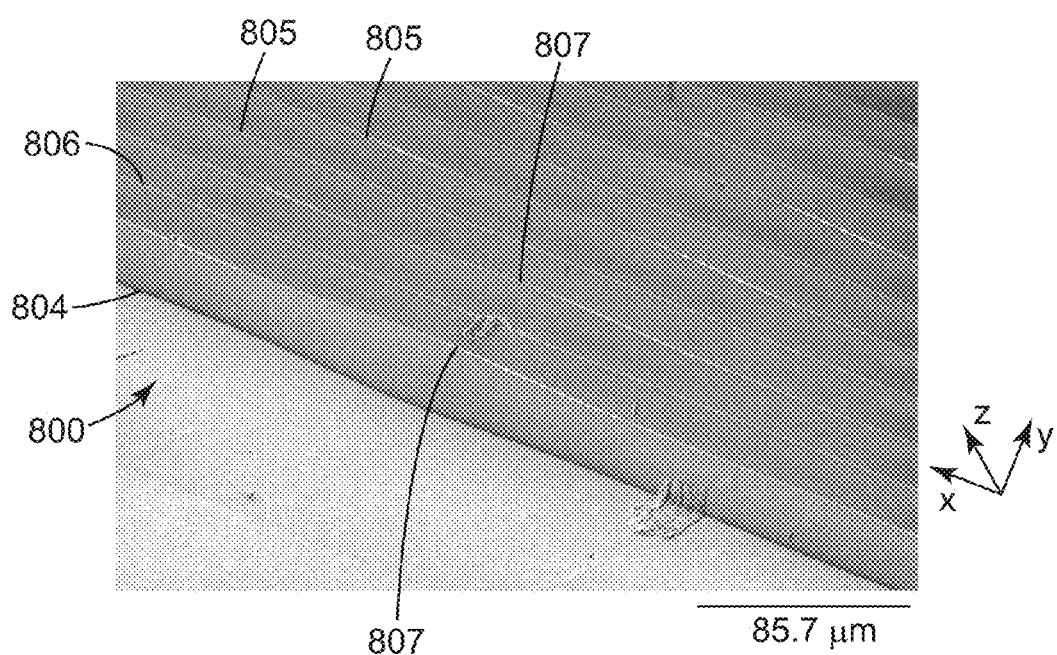
FIG. 12 is a are photomicrograph showing a perspective view of a light directing film including microstructures with a regular arrangement of second regions.

FIG. 12 shows a portion of a light directing film 800 with a structured surface 804 including continuous prismatic microstructures 806 extending along the x direction. The microstructures include first regions 805, as well as a substantially regular distribution of second regions 807, which appear as raised areas on every other microstructure 806. The second regions 807 have a maximum height along the z direction that is greater than the substantially constant height of the first regions 805. The second regions 807 also extend outwardly along the y direction so that their cross sectional profile remains the same as the cross sectional profile of the first regions 805.

Figure 13A:
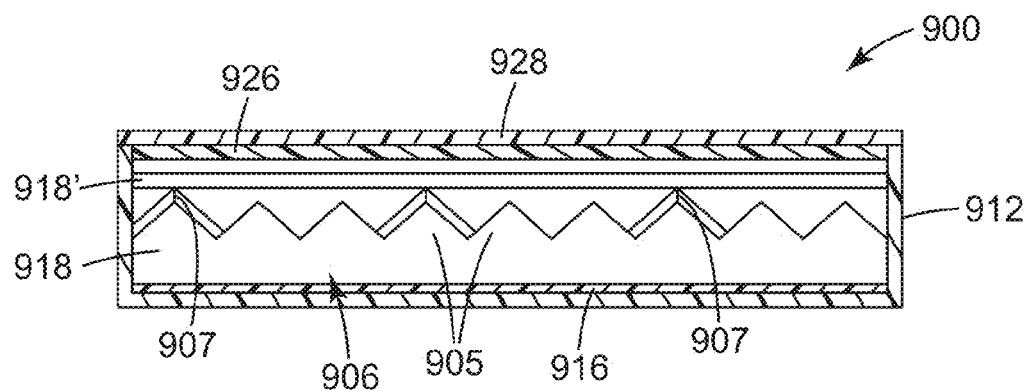
FIG. 13A is a cross-sectional view of an optical display including a light directing optical film.

FIG. 13A illustrates, in cross-section, a representative embodiment of a display 900 incorporating a light directing film as described herein. The display 900 includes a case 912, a light source 916, a first sheet of light directing film 918, a second sheet of light directing film 918', a light gating device 926, and a substantially transparent cover sheet 928. In the embodiment disclosed in FIG. 13A the light source 916 can be, for example, a LED, an OLED, an electroluminescent panel, or a fluorescent light source. Additionally, while the light gating device 926 disclosed in FIG. 13A is preferably a liquid crystal device, other light gating devices may be used.

The first sheet of light directing film 918 is exemplary of the embodiment illustrated in FIG. 3A, and includes microstructures 906 with a first region 905 and a second region 907. The microstructure 906 has the same cross-sectional shape in each of the first and second regions 905, 907. The first regions 905 have a substantially constant height, and the second regions 907 have a maximum height greater than the substantially constant height of the first regions 905. It will be appreciated that FIG. 13A is not drawn to scale and that, in particular, the size of the structured surface of light directing film 918 is greatly exaggerated for illustrative purposes. As shown in FIG. 13A, the peaks in the second regions 907 control the physical proximity of the second sheet of light directing film 918' to the first sheet 918. In accordance with the previous discussion, optical coupling is concentrated in the zones which have relatively higher peaks, which are preferably between about 1 µm and about 2.5 µm in height. While FIG. 13A shows the light directing film oriented in a direction such that the peaks 907 of the microstructures are directed away from the light source 916, in another embodiment the peaks 507 may be directed toward the light source 916.

Figure 13B:
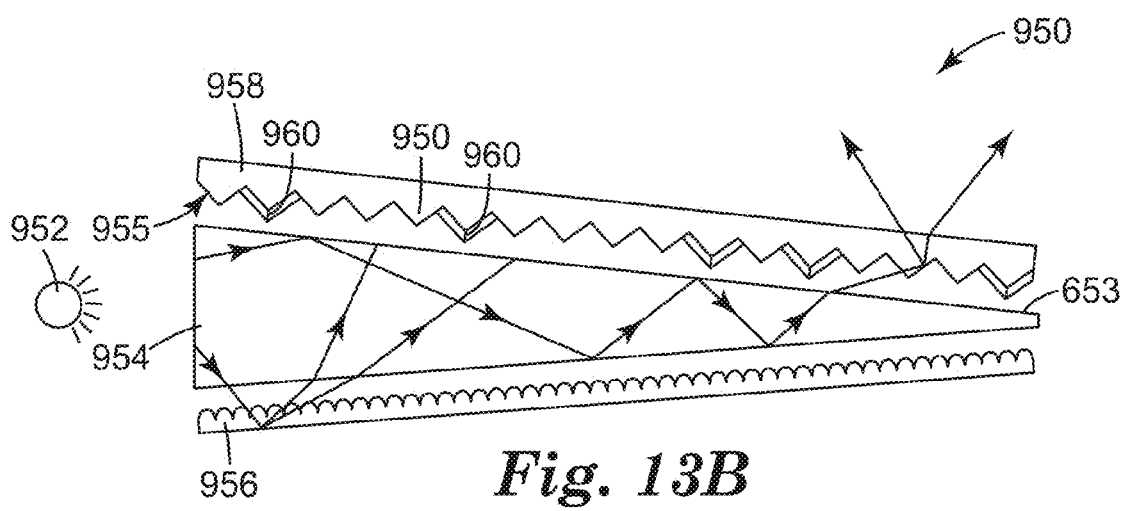
FIG. 13B is a cross-sectional view of a light guide assembly including a light directing optical film.

FIG. 13B illustrates another useful application of a sheet of light directing film as described herein. FIG. 13B is a schematic illustration of a commonly used light guide assembly 950 for use in an optical display. The light guide assembly 950 includes a light source 952, a wedge-shaped light guide 954, a diffusive reflector 956, and a sheet of light directing film 958. In use, light from the light source 952 is directed into light guide 954. Light rays which strike the surface of light guide 954 at greater than the critical angle undergo total internal reflection and are propagated along light guide 954. By contrast, light rays which strike the surface of light guide 954 at less than the critical angle are transmitted and refracted. Light rays that exit the bottom surface of light guide 954 are reflected by diffusive reflector 956 and are "recycled" for use. Light rays that exit the top surface of light guide 954 are passed through a light gating means such as a liquid crystal device to produce an image on a display.

Figure 1:
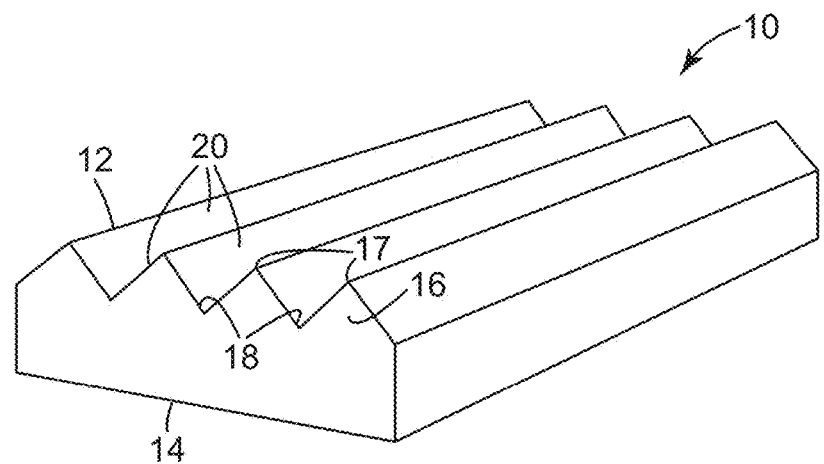
FIG. 1 is a schematic diagram in perspective of a brightness enhancing film suitable for use in an optical display.

Conventional light directing films, as depicted in FIG. 1, may allow optical coupling to occur between the structured surface 955 of the light directing film and the upper surface 953 of the light guide 954. The microstructures 957 on the structured surface 955 of the light directing film 958 include second regions 960 that inhibit the occurrence of visible optical coupling by controlling the proximity of the structured surface 955 of light directing film 958 to light guide 954.

Although the particular material used for the light directing film may vary widely depending on the intended application, the material should be substantially transparent to ensure high optical transmission. Useful polymeric materials for this purpose are commercially available, and include, for example, acrylics and polycarbonates having nominal indices of refraction of about 1.493 and 1.586, respectively. Other useful polymers include polypropylene, polyurethane, polystyrene, polyvinyl chloride, and the like. Materials having higher indices of refraction will generally be preferred.

A smooth polyester film that may be used as a substrate for the light directing film is commercially available from ICI Americas Inc. Hopewell, Va. under the trade designation Melinex 617. A matte finish coating that may be applied on a film to be used as a substrate is commercially available from Tekra Corporation of New Berlin, Wis., under the trade designation Marnot 75 GU. Other films could be used as well. These films could be chosen for their optical, mechanical, or other properties. For example, a substrate could be a multi-layer optical film as described in published PCT patent application WO97/01774. Examples of other films that could be used are wavelength selective multi-layer optical films and reflective polarizers. Reflective polarizers could be multi-layer films, cholesteric materials, or materials of the type disclosed in published PCT patent application WO-97/32227.

Masters for the tools used for manufacturing the light directing films described herein, whether by extrusion or by a cast and cure process, may be made by known diamond turning techniques. Suitable diamond turning apparatus are shown and described in U.S. Pat. Nos. 6,322,236, 6,354,709, 7,328,638, and WO/00/48037.

The apparatus used in methods and for making the light directing films typically includes a fast servo tool. The fast tool servo (FTS) is a solid state piezoelectric (PZT) device, referred to as a PZT stack, which rapidly adjusts the position of a cutting tool attached to the PZT stack. The FTS allows for highly precise and high speed movement of the cutting tool in directions within a coordinate system as further described below.

Figure 14:
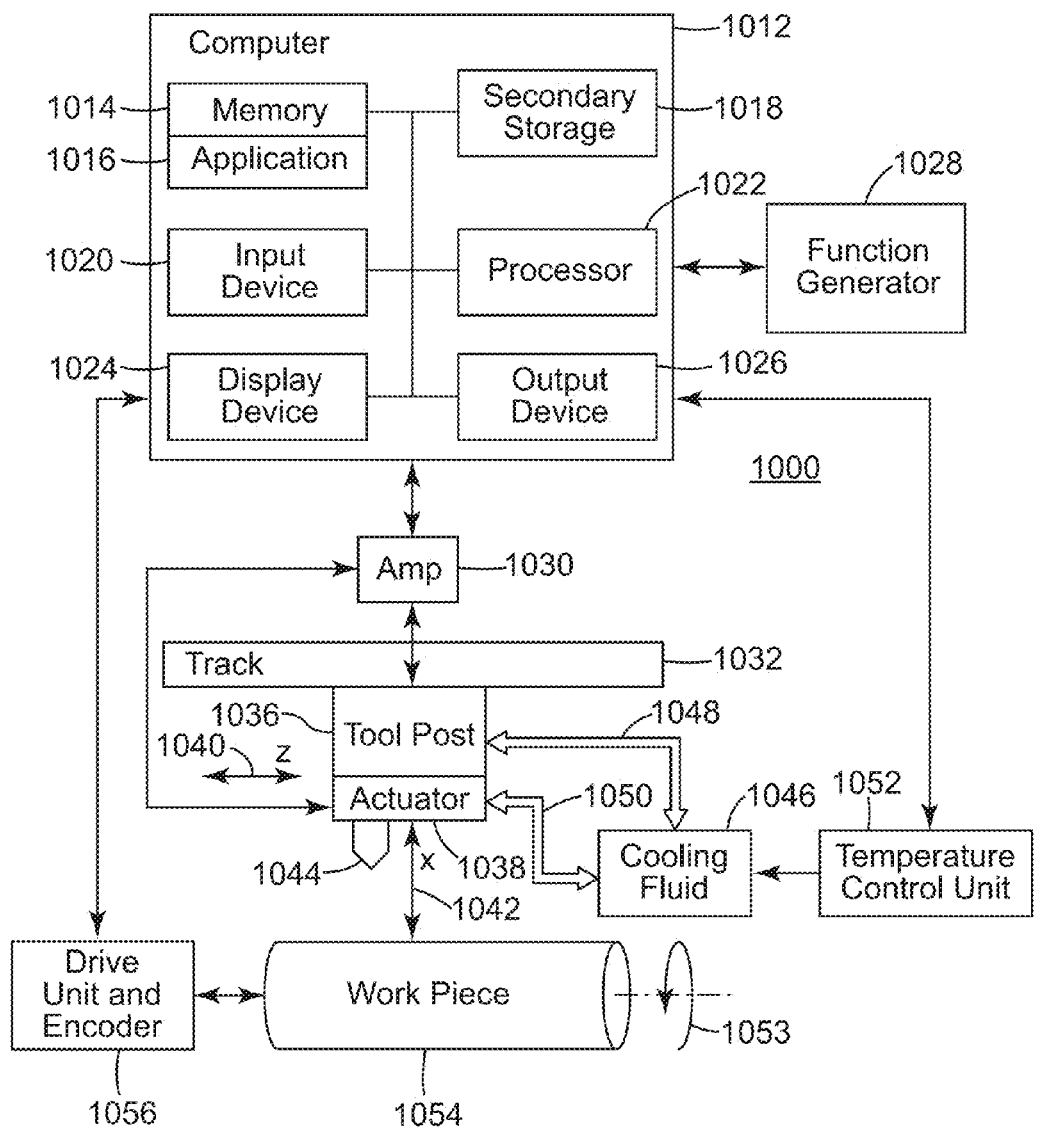
FIG. 14 is a diagram of a cutting tool system for making microstructures in a work piece.

FIG. 14 is a diagram of a cutting tool system 1000 for making microstructures in a work piece. Microstructures can include any type, shape, and dimension of structures on, indenting into, or protruding from the surface of an article. System 1000 is controlled by a computer 1012. Computer 1012 has, for example, the following components: a memory 1014 storing one or more applications 1016; a secondary storage 1018 providing for non-volatile storage of information; an input device 1020 for receiving information or commands; a processor 1022 for executing applications stored in memory 1016 or secondary storage 1018, or received from another source; a display device 1024 for outputting a visual display of information; and an output device 1026 for outputting information in other forms such as speakers for audio information or a printer for a hardcopy of information.

The cutting of a work piece 1054 is performed by a tool tip 1044. An actuator 1038 controls movement of tool tip 1044 as work piece 1054 is rotated by a drive unit and encoder 1056, such as an electric motor controlled by computer 1012. In this example, work piece 1054 is shown in roll form; however, it can be implemented in planar form. Any machineable materials could be used; for example, the work piece can be implemented with aluminum, nickel, copper, brass, steel, or plastics (e.g., acrylics). The particular material to be used may depend, for example, upon a particular desired application such as various films made using the machined work piece. Actuator 1038 can be implemented with stainless steel, for example, or other materials, and suitable actuators are shown and described, for example, in U.S. Pat. No. 7,328,638.

Actuator 1038 is removably connected to a tool post 1036, which is in turn located on a track 1032. The tool post 1036 and actuator 1038 are configured on track 1032 to move in both an x-direction and a z-direction as shown by arrows 1040 and 1042. Computer 1012 is in electrical connection with tool post 1036 and actuator 1038 via one or more amplifiers 1030.

When functioning as a controller, computer 1012 controls movement of tool post 1036 along track 1032 and movement of tool tip 1044 via actuator 1038 for machining work piece 1054. If an actuator has multiple PZT stacks, it can use separate amplifiers to independently control each PZT stack for use in independently controlling movement of a tool tip attached to the stacks. Computer 1012 can make use of a function generator 1028 to provide waveforms to actuator 1038 in order to machine various microstructures in work piece 1054, as further explained below.

The machining of work piece 1054 is accomplished by coordinated movements of various components. In particular, the system, under control of computer 1012, can coordinate and control movement of actuator 1038, via movement of tool post 1036, along with movement of the work piece in the c-direction (rotational movement as represented by the line 1053 in FIG. 14) and movement of tool tip 1044 in one or more of the x-direction, y-direction, and z-direction, those coordinates being explained below. The system typically moves tool post 1036 at a constant speed in the z-direction, although a varying speed may be used. The movements of tool post 1036 and tool tip 1044 are typically synchronized with the movement of work piece 1054 in the c-direction. All of these movements can be controlled using, for example, numerical control techniques or a numerical controller (NC) implemented in software, firmware, or a combination in computer 1012.

The cutting of the work piece can include continuous and discontinuous cutting motion. For a work piece in roll form, the cutting can include a helix-type cutting (sometimes referred to as thread cutting) or individual circles around or about the roll. For a work piece in planar form, the cutting can include a spiral-type cutting or individual circles on or about the work piece. An X-cut can also be used, which involves a nearly straight cutting format where the diamond tool tip can traverse in and out of the work piece but the overall motion of the tool post is rectilinear. The cutting can also include a combination of these types of motions.

Work piece 1054, after having been machined, can be used to make films having the corresponding microstructures for use in a variety of applications. The films are typically made using a coating process in which a polymeric material in a viscous state is applied to the work piece, allowed to at least partially cure, and then removed. The film composed of the cured polymer material will have substantially the opposite structures than those in the work piece. For example, an indentation in the work piece results in a protrusion in the resulting film. Work piece 1054, after having been machined, can also be used to make other articles having discrete elements or microstructures corresponding with those in the tool.

Cooling fluid 1046 is used to control the temperature of tool post 1036 and actuator 1038 via lines 1048 and 1050. A temperature control unit 1052 can maintain a substantially constant temperature of the cooling fluid as it is circulated through tool post 1036 and actuator 1038. Temperature control unit 1052 can be implemented with any device for providing temperature control of a fluid. The cooling fluid can be implemented with an oil product, for example a low viscosity oil. The temperature control unit 1052 and reservoir for cooling fluid 1046 can include pumps to circulate the fluid through tool post 1036 and actuator 1038, and they also typically include a refrigeration system to remove heat from the fluid in order to maintain it at a substantially constant temperature. In certain embodiments, the cooling fluid can also be applied to work piece 54 to maintain a substantially constant surface temperature of the material to be machined in the work piece.

FIG. 15 is a diagram illustrating a coordinate system for a cutting tool such as system 10. The coordinate system is shown as movement of a tool tip 1062 with respect to a work piece 1064. Tool tip 1062 may correspond with tool tip 1044 and is typically attached to a carrier 1060, which is attached to an actuator. The coordinate system, in this exemplary embodiment, includes an x-direction 1066, a y-direction 1068, and a z-direction 1070. The x-direction 1066 refers to movement in a direction substantially perpendicular to work piece 1064. The y-direction 1068 refers to movement in a direction transversely across work piece 1064 such as in a direction substantially parallel to a plane of rotation of work piece 1064. The z-direction 1070 refers to movement in a direction laterally along work piece 1064 such as in a direction substantially parallel to the axis of rotation of work piece 1064. The rotation of the work piece is referred to as the c-direction, as also shown in FIG. 14. If the work piece is implemented in planar form, as opposed to roll form, then the y-direction and z-direction refer to movement in mutually orthogonal directions across the work piece in directions substantially perpendicular to the x-direction. A planar form work piece can include, for example, a rotating disk or any other configuration of a planar material.

FIG. 16A is a perspective view of a typical tool tip 1062 that may be used in making the light directing films described in this disclosure, and FIG. 16B is a front view thereof, FIG. 16C is a bottom view thereof, and FIG. 16D is a side view thereof. As shown in FIGS. 16A-16D, tool tip 1062 includes sides 1104, tapered and angled front surfaces 1106, and a bottom surface 1102 for securing the tip 1062 to a suitable tool tip carrier (not shown in FIGS. 16A-D). The front portion 1105 of tool tip 1062 is used for machining of a work piece under control of an actuator. Tool tip 1062 can be implemented with, for example, a diamond slab.

In one embodiment, to produce the first and the second regions on the microstructures in a single pass on the diamond turning machine, a fast tool servo actuator is added to the diamond turning apparatus. In another embodiment, the first regions of the microstructures on the light directing film may be produced in a first pass on the diamond turning machine in which the tool is set to make a cut of substantially constant depth in the roll. Then, in a second pass on the diamond turning machine, the same tool is used to cut the second regions of the microstructures in a regular, random or pseudo-random pattern.

Selection of a single pass or a multi-pass cutting process can have an impact on the shape of the second regions on the microstructures. For example, a single pass cutting process produces a microstructure having substantially continuous second regions with a smooth, more slowly varying slope (FIG. 4A). Typically, a multi-pass cutting process produces a second region with a sharp, discontinuous shape have a rapidly varying slope (FIG. 4B).

The invention will now be further explained with reference to the following non-limiting examples.

EXAMPLES

Light directing films having microstructures with first and second regions were made from rolls whose surfaces were prepared using a diamond turning process. The rolls included patterned grooves produced in a single pass using a fast tool servo actuator as described in, for example, U.S. Pat. Nos. 6,322,709 and 7,328,638. A polymeric material was then cast onto the rolls to form films with microstructured surfaces replicating the diamond cut patterns in the grooves. The characteristics of the patterns in the films are shown in Table 1 below.

In Table 1 the maximum period and the average period are evaluated along a microstructure. The period along a microstructure is measured from the start of one second region to the start of an adjacent second region on that microstructure.

Figure 2:
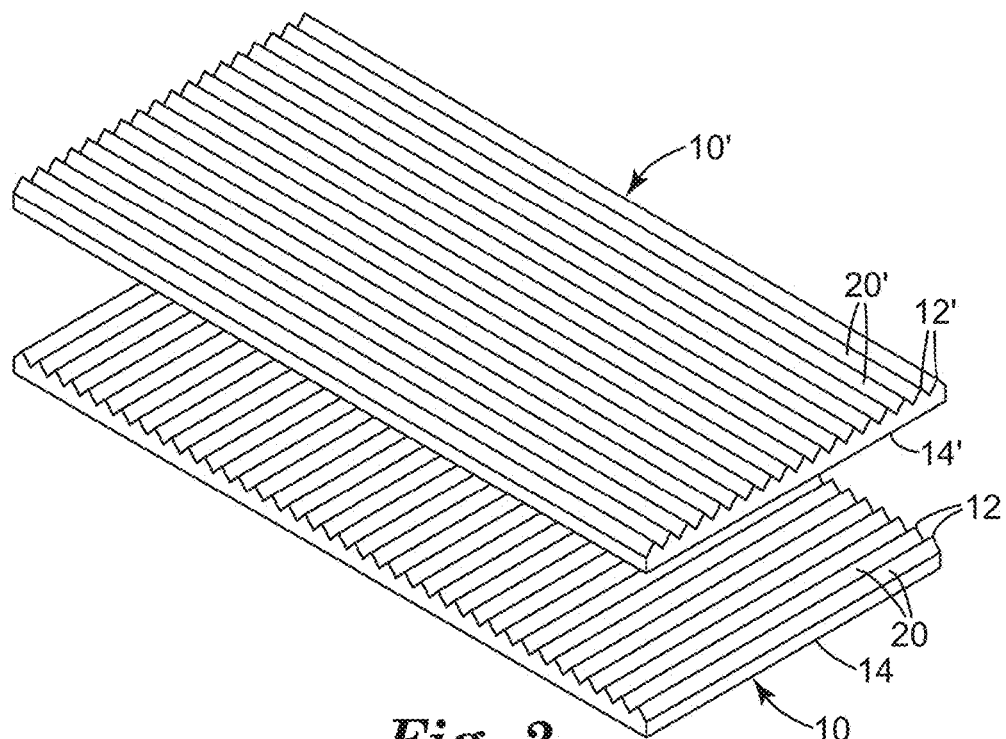
FIG. 2 is an exploded perspective view of a light directing article constructed from two sheets of The method of FIG. 1 placed adjacent to one another.

To determine wetout ratings in Table 1, the microstructured side of each sample was placed next to the smooth side of another microstructured film such as that shown in FIG. 1. The samples were oriented as shown in FIG. 2. When viewed on a light table, the amount of optical coupling between the films was subjectively evaluated and rated using the following rating system:

0—No Wetout Visible
1—Wetout very light, somewhat difficult to see
2—Wetout is dim, but still visible
3—Wetout easily visible
4—Wetout bright, but lacking pattern of lines
5—Bright wetout with pattern of lines To determine the cosmetic ratings in Table 1, a single film sample was placed on the light table and its appearance was subjectively assessed relative to the appearance of conventional light directing films available from 3M, St. Paul, Minn., under the trade designations BEF 2 and BEF 3. A value of 1 was assigned to BEF 2 and a value of 5 was assigned to BEF 3.

To determine gain change in Table 1, the samples were compared to a light directing film including linear prismatic structures with a substantially constant height, and without any second regions (see, for example, The method of FIG. 1).

TABLE 1

| Pattern | Micro-structure (Prism) Pitch | Min Period of Second Regions | Max Period of Second Regions | Average Period of Second Regions | Density of Second Regions (#/cm$^2$) | Height of Second Regions (μm) | Wetout Rating | Cosmetic Rating | Gain Change |
|---|---|---|---|---|---|---|---|---|---|
| 1 | 24 | 851 | 1560 | 1206 | 3455 | 0.6 | 5 | 2 | 1.19% |
| 2 | 24 | 2624 | 4043 | 3334 | 1249 | 0.6 | 5 | 2 | 0.43% |
| 3 | 24 | 7235 | 14328 | 10781 | 386 | 0.6 | 5 | 1 | −0.99% |
| 4 | 24 | 851 | 1560 | 1206 | 3455 | 1.2 | 3 | 2 | −0.29% |
| 5 | 24 | 2483 | 4823 | 3653 | 1140 | 1.2 | 3 | 2 | 0.17% |
| 6 | 24 | 7235 | 14328 | 10781 | 386 | 1.2 | 2 | 1 | −0.65% |
| 7 | 19 | 1560 | 2979 | 2270 | 2318 | 1.5 | 2 | 3 | −1.3% |
| 8 | 19 | 3121 | 6100 | 4610 | 1141 | 1.5 | 2 | 2 | −1.1% |
| 9 | 19 | 9150 | 18158 | 13654 | 385 | 1.5 | 1 | 1 | −0.6% |
| 10 | 24 | 851 | 1560 | 1206 | 3455 | 2.0 | 2 | 3 | 0.05% |
| 11 | 24 | 1323 | 2505 | 1914 | 2177 | 2.0 | 2 | 3 | −0.7% |
| 12 | 24 | 2483 | 4824 | 3654 | 1140 | 2.0 | 1 | 2 | −0.74% |
| 13 | 24 | 7235 | 14328 | 10781 | 386 | 2.0 | 1 | 2 | −0.79% |
| 14 | 24 | 35607 | 71072 | 53339 | 78 | 2.0 | 4 | 5 | −1.4% |

Figure 17:
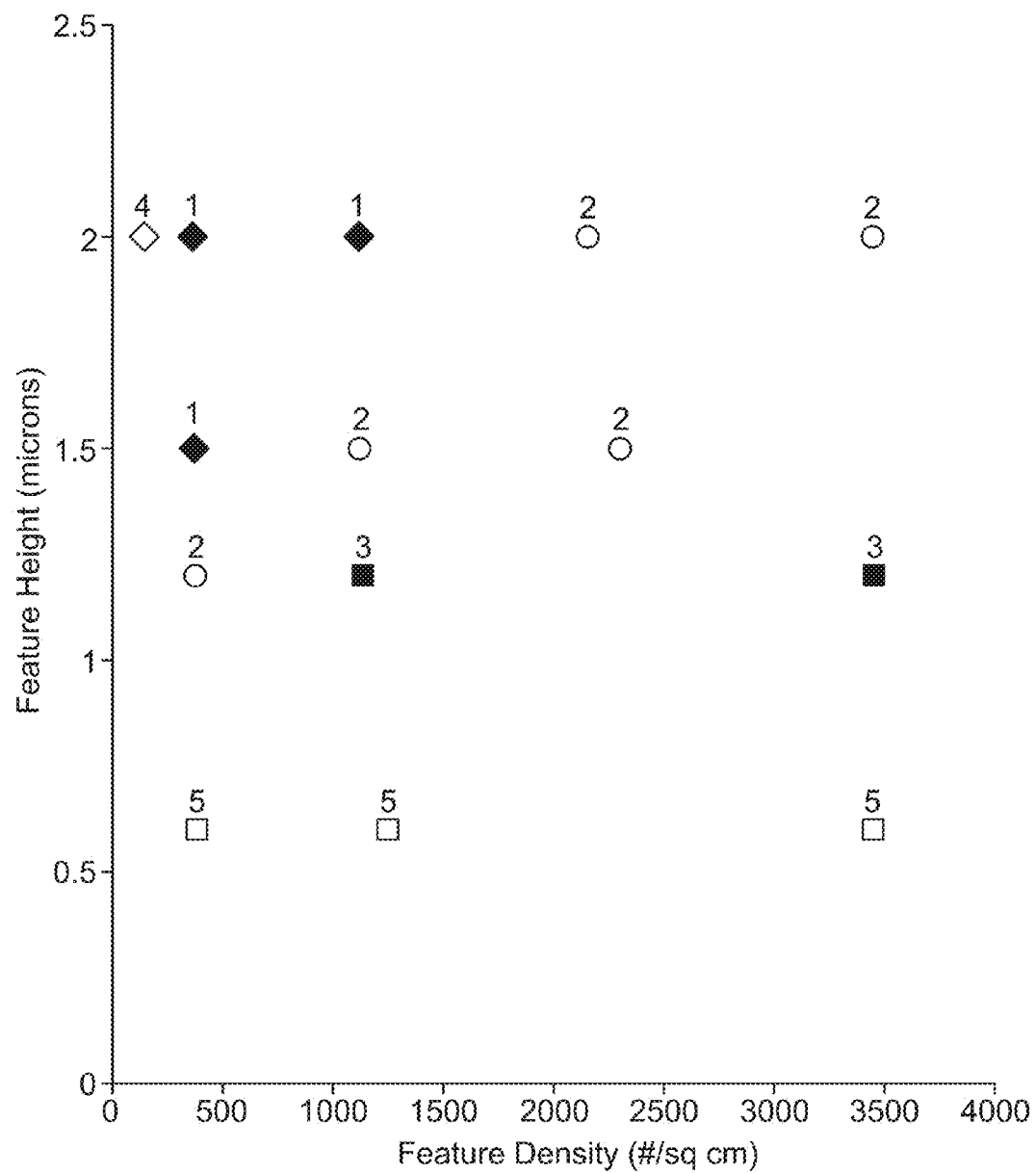
FIG. 17 is a plot summarizing the anti-wet out performance of the films in Table 1.
Figure 18:
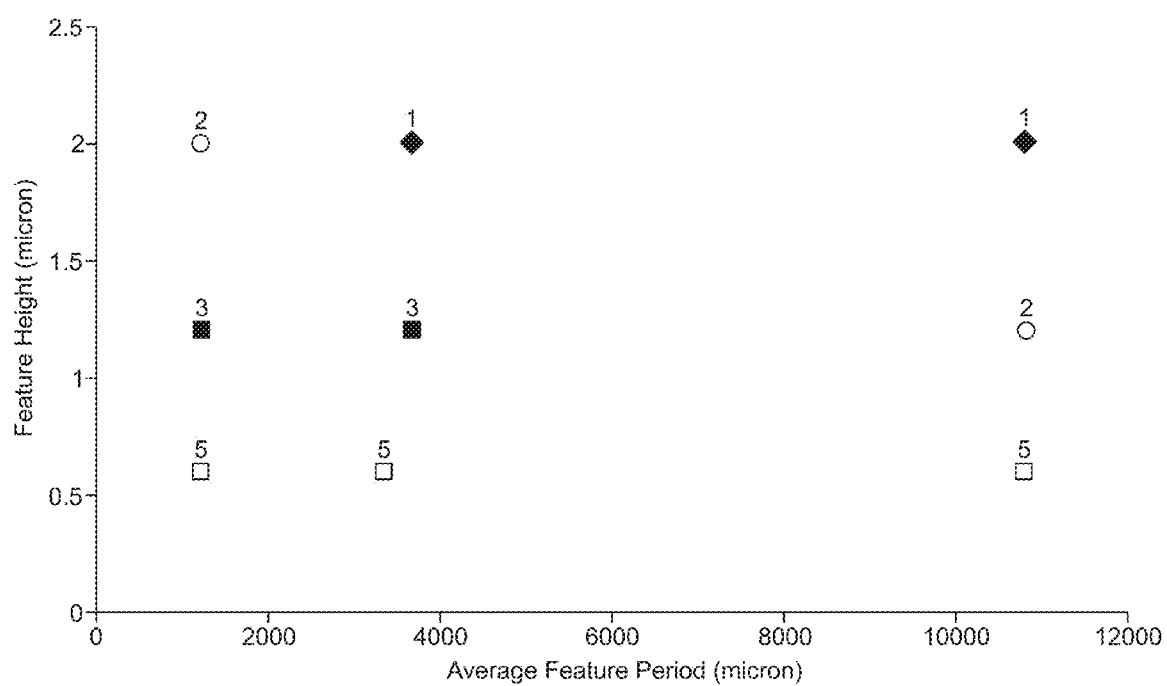
FIG. 18 is a plot summarizing the anti-wet out performance of the films in Table 1.

In addition to the results shown in Table 1, the performance of the films is summarized in FIGS. 17-18.

FIG. 17 summarizes the anti-wet out performance of the films in Table 1 by plotting the height of the second regions against the density of the second regions on the film. In general, the results plotted in FIG. 17 show that second regions with a height of about 1 to about 2 microns and an average feature density of about 200 to about 3500 second regions per cm$^2$ provide the best anti-wetout performance.

FIG. 18 summarizes the anti-wet out performance of the films in Table 1 by plotting the height of the second regions against the average period of the second regions. In general, the results plotted in FIG. 18 show that second regions with a height of about 1 to about 2 microns and an average feature period of about 1000 μm to about 12000 μm provide the best anti-wetout performance.

As noted above, the present invention is applicable to display systems and is believed to be particularly useful in reducing cosmetic defects in displays and screens having multiple light management films, such as backlit displays and rear projection screens. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The invention claimed is:

1. A method of making a light directing film, comprising: applying polymeric material onto a tool with a structured major surface to form a light directing film with a structured major surface, wherein the structured major surface of the light directing film comprises a plurality of microstructures, wherein at least a portion of the microstructures are linear and extend along a first direction, and wherein each microstructure comprises:
first regions with a constant height along a second direction normal to the first direction and a first apex having a first dihedral angle $\alpha_1$, and
second regions adjacent to the first regions, wherein the second regions have a non-constant height along the second direction and a maximum height greater than the constant height of the first regions and a second apex having a second dihedral angle $\alpha_2$ the same as $\alpha_1$, and wherein the second regions extend outwardly along a third direction normal to the first and the second directions such that the first regions and the second regions have the same lateral cross sectional shape; and
wherein the second regions are arranged on the structured major surface such that at least one of: (1) the average density of the second regions on the structured major surface, (2) the average period of the second regions on the structured major surface, and (3) the height of the second regions relative to the height of the first regions, are sufficient to control the proximity of a second major surface to the structured major surface such that the second major surface contacts the second regions on the structured major surface and optical coupling between the structured major surface and the second major surface occurs primarily within the second regions.

2. The method of claim 1, wherein the second regions are distributed randomly on the microstructures on the major surface of the film.

3. The method of claim 1, wherein the second regions are distributed regularly on the microstructures on the major surface of the film.

4. The method of claim 3, wherein the regular distributions are periodic.

5. The method of claim 3, wherein the regular distributions are aperiodic.

6. The method of claim 1, wherein the maximum height in the second regions is about 0.5 μm to about 3 μm greater than the constant height.

7. The method of claim 1, wherein a density of the second regions is from about 200 to about 6000 per cm$^2$ of the structured surface.

8. The method of claim 1, wherein a period of the second regions is about 1000 to about 20,000 μm.

9. The method of claim 1, wherein at least two second regions have a same maximum height.

10. The method of claim 1, wherein at least two second regions have different maximum heights.

11. A method of reducing wet out in a display device, comprising incorporating into the device a light directing film, wherein the light directing film comprises a structured major surface, wherein the structured major surface comprises a plurality of microstructures, wherein at least a portion of the microstructures are linear and extend along a first direction, and wherein each microstructure comprises:

first regions with a constant height along a second direction normal to the first direction and a first apex having a first dihedral angle $\alpha_1$, and second regions adjacent to the first regions, wherein the second regions have a non-constant height along the second direction and a maximum height greater than the constant height of the first regions and a second apex having a second dihedral angle $\alpha_2$ the same as $\alpha_1$, and wherein the second regions extend outwardly along a third direction normal to the first and the second directions such that the first regions and the second regions have the same lateral cross sectional shape; and wherein the second regions are arranged on the structured major surface such that at least one of: (1) the average density of the second regions on the structured major surface, (2) the average period of the second regions on the structured major surface, and (3) the height of the second regions relative to the height of the first regions, are sufficient to control the proximity of a second major surface to the structured major surface such that the second major surface contacts the second regions on the structured major surface and optical coupling between the structured major surface and the second major surface occurs primarily within the second regions.

12. The method of claim 11, wherein the second regions are distributed randomly on the microstructures on the major surface of the film.

13. The method of claim 11, wherein the second regions are distributed regularly on the microstructures on the major surface of the film.

14. The method of claim 13, wherein the regular distributions are periodic.

15. The method of claim 13, wherein the regular distributions are aperiodic.

16. The method of claim 11, wherein the maximum height in the second regions is about 0.5 µm to about 3 µm greater than the constant height.

17. The method of claim 11, wherein a density of the second regions is from about 200 to about 6000 per cm² of the structured surface.

18. The method of claim 11, wherein a period of the second regions is about 1000 to about 20,000 µm.

19. The method of claim 11, wherein at least two second regions have a same maximum height.

20. The method of claim 11, wherein at least two second regions have different maximum heights.

* * * * *

UNITED STATES PATENT AND TRADEMARK OFFICE
CERTIFICATE OF CORRECTION

PATENT NO.        : 10,197,713 B2                                       Page 1 of 1
APPLICATION NO.   : 15/804883
DATED             : February 5, 2019
INVENTOR(S)       : Alan Campbell It is certified that error appears in the above-identified patent and that said Letters Patent is hereby corrected as shown below:

In the Specification

<u>Column 1</u>
Line 7, Delete "12/934,835," and insert -- 12/934,855, --.

<u>Column 5</u>
Line 51, Delete "hi" and insert -- $h_1$ --.

<u>Column 8</u>
Line 2, Delete "they" and insert -- the y --.

Signed and Sealed this
Twenty-fourth Day of September, 2019

Andrei Iancu
*Director of the United States Patent and Trademark Office*